US012594554B2

(12) United States Patent
Halverson et al.

(10) Patent No.: US 12,594,554 B2
(45) Date of Patent: Apr. 7, 2026

(54) ARTICLES HAVING CONFORMAL LAYERS AND METHODS OF MAKING SAME

(71) Applicant: Solventum Intellectual Properties Company, Maplewood, MN (US)

(72) Inventors: Kurt J. Halverson, Lake Elmo, MN (US); Steven P. Swanson, Blaine, MN (US); Raymond P. Johnston, Lake Elmo, MN (US)

(73) Assignee: Solventum Intellectual Properties Company, Maplewood, MN (US)

( * ) Notice: Subject to any disclaimer, the term of this patent is extended or adjusted under 35 U.S.C. 154(b) by 979 days.

(21) Appl. No.: 17/611,239

(22) PCT Filed: Jun. 22, 2020

(86) PCT No.: PCT/IB2020/055856
§ 371 (c)(1),
(2) Date: Nov. 15, 2021

(87) PCT Pub. No.: WO2020/261086
PCT Pub. Date: Dec. 30, 2020

(65) Prior Publication Data
US 2022/0212186 A1      Jul. 7, 2022

Related U.S. Application Data

(60) Provisional application No. 62/868,180, filed on Jun. 28, 2019.

(51) Int. Cl.
*B01L 3/00* (2006.01)
*B32B 3/26* (2006.01)
*B32B 27/08* (2006.01)

(52) U.S. Cl.
CPC ... *B01L 3/502707* (2013.01); *B01L 3/502715* (2013.01); *B32B 3/263* (2013.01);
(Continued)

(58) Field of Classification Search
CPC ..... B01L 2300/0645; B01L 2300/0887; B01L 2300/161; B01L 2400/0406;
(Continued)

(56) References Cited

U.S. PATENT DOCUMENTS 5,435,816 A    7/1995  Spurgeon
5,798,031 A    8/1998  Charlton
(Continued)

FOREIGN PATENT DOCUMENTS

CN      107667009 A     2/2018
CN      108431643 A     8/2018
(Continued)

OTHER PUBLICATIONS

"ASTM D1525-17 Standard Test Method for Vicat Softening Temperature of Plastics", Apr. 2019, 11 pages.
(Continued)

*Primary Examiner* — Dean Kwak

(57) ABSTRACT

The present disclosure provides articles having conformal layers and methods of making such articles. An article includes a first polymeric layer having a substantially planar major surface and an opposing major surface bonded to a second polymeric layer. One major surface of the second polymeric layer is conformal to the first polymeric layer while the opposing major surface defines a cavity having at least one wall. The second polymeric layer also has a channel connecting the cavity to at least one edge of the second polymeric layer or to the planar surface of the first polymeric layer. A surface of the cavity exhibits an advancing contact angle with water of less than 90 degrees. A method includes obtaining a tool having protruding features; disposing a first polymer on the protruding features; disposing a second polymer on the first polymer; and applying compression to the polymeric tooling, the first polymer, and
(Continued)

the second polymer at an elevated temperature to form the article. The articles can be formed to have small cavities for use as precision fluidic devices, such as blood glucose testing strips.

16 Claims, 8 Drawing Sheets

(52) U.S. Cl.
CPC ........... *B32B 27/08* (2013.01); *B01L 2200/16* (2013.01); *B01L 2300/0645* (2013.01); *B01L 2300/0887* (2013.01); *B01L 2300/161* (2013.01); *B32B 2307/728* (2013.01); *B32B 2307/732* (2013.01); *B32B 2307/734* (2013.01); *B32B 2535/00* (2013.01)

(58) Field of Classification Search
CPC ........... B01L 3/502707; B01L 2200/16; B01L 2300/0636; B01L 2300/0825; B01L 2300/089; B01L 2300/0896; B01L 3/5023; B01L 3/5027; B01L 3/502715; B01L 3/50273; B01L 9/527; B32B 27/08; B32B 27/308; B32B 27/36; B32B 2535/00; B32B 2250/24; B32B 2307/728; B32B 2307/732; B32B 27/32; B32B 27/40; B32B 3/263; B32B 2250/02; B32B 2250/03; B32B 2250/05; B32B 2255/10; B32B 2255/102; B32B 2255/205; B32B 2255/26; B32B 2270/00; B32B 2307/538; B32B 2307/546; B32B 2307/734; B32B 2405/00; B32B 2457/00; B32B 2605/00; B32B 27/18; B32B 27/281; B32B 27/304; B32B 27/306; B32B 3/10; B32B 3/266; B32B 3/30; B32B 7/027; B32B 7/12; B32B 7/14
See application file for complete search history.

(56) References Cited

U.S. PATENT DOCUMENTS

| | | | | |
|---|---|---|---|---|
| 6,372,323 | B1 * | 4/2002 | Kobe | ....................... B25G 1/10 |
| | | | | 4/581 |
| 6,524,649 | B1 | 2/2003 | Sher | |
| 6,531,206 | B2 * | 3/2003 | Johnston | ................... B01D 1/00 |
| | | | | 428/167 |
| 6,696,157 | B1 | 2/2004 | David | |
| 6,881,538 | B1 | 4/2005 | Haddad | |
| 7,087,279 | B2 | 8/2006 | Callahan | |
| 7,118,668 | B1 | 10/2006 | Edelbrock | |
| 7,223,364 | B1 | 5/2007 | Johnston | |
| 7,553,393 | B2 | 6/2009 | Derand | |
| 7,687,126 | B2 | 3/2010 | Fleming | |
| 8,617,367 | B2 | 12/2013 | Edelbrock | |
| 8,664,323 | B2 | 3/2014 | Iyer | |
| 8,920,628 | B2 | 12/2014 | Gerber | |
| 9,074,240 | B2 | 7/2015 | Rueckert | |
| 9,658,188 | B2 | 5/2017 | Beer | |
| 9,976,168 | B2 | 5/2018 | Katsuki | |
| 10,098,980 | B2 | 10/2018 | Karls | |
| 2005/0106360 | A1 * | 5/2005 | Johnston | ............. E04D 13/0445 |
| | | | | 428/167 |
| 2007/0139451 | A1 * | 6/2007 | Somasiri | ............... C23C 16/045 |
| | | | | 428/137 |
| 2009/0257003 | A1 * | 10/2009 | Yoshihara | ............... G06F 3/045 |
| | | | | 359/507 |
| 2010/0175999 | A1 | 7/2010 | Barlow | |
| 2016/0089867 | A1 | 3/2016 | Klonig | |
| 2017/0045284 | A1 * | 2/2017 | Meuler | ................... F25D 21/14 |
| 2017/0254772 | A1 | 9/2017 | Bauer-Espindola | |
| 2018/0134010 | A1 | 5/2018 | Branigan et al. | |
| 2018/0354225 | A1 | 12/2018 | Solomon et al. | |

FOREIGN PATENT DOCUMENTS

| | | |
|---|---|---|
| EP | 3053652 | 8/2016 |
| WO | WO 1998-045693 | 10/1998 |
| WO | WO 2001-025138 | 4/2001 |
| WO | WO 2007-075665 | 7/2007 |
| WO | WO 2011-065729 | 6/2011 |
| WO | WO 2011-070102 | 6/2011 |
| WO | WO 2015-164632 | 10/2015 |
| WO | WO 2018-236833 | 12/2018 |
| WO | WO 2020-035764 | 2/2020 |
| WO | WO 2021-099998 | 5/2021 |

OTHER PUBLICATIONS

Matsumoto, "Synthesis and Thermal Properties of Poly (cycloalkyl methacrylate) s Bearing Bridged- and Fused-Ring Structures", Journal of Polymer Science Part A Polymer Chemistry, Sep. 1993, vol. 31, No. 10, pp. 2531-2539.
International Search Report for PCT International Application No. PCT/IB2020/055856, mailed on Sep. 24, 2020, 5 pages.

* cited by examiner

ARTICLES HAVING CONFORMAL LAYERS AND METHODS OF MAKING SAME

TECHNICAL FIELD

The present disclosure broadly relates to articles having conformal layers and methods of making the articles, such as melt bonding methods.

BACKGROUND

Currently die cutting and rotary converting processes are often utilized for manufacturing of fluidic devices used in diagnostic and wearable devices. These processes are limited in their ability to produce small and complex structures and often require multiple individual film constructions that are costly and difficult to assemble. For instance, a common approach to forming a fluidic device chamber is cutting a small notch out of a double coated tape, laminating the tape to a bottom layer with the notch aligned over a sensor, followed by laminating a hydrophilic cover film to form the top of the chamber. However, there is a practical limit to die cutting small features from tapes, making it challenging to reduce the volume of sample required to less than approximately 1 microliter. The volume of the chamber is defined by the thickness of the double coated tape, requiring precise caliper control that is difficult to achieve with adhesive coating processes. In addition to the challenges associated with fluidic device assembly, there are also materials issues associated with utilizing double coated tapes to form capillary features. It is challenging, for instance, to render the sidewalls formed by die cutting a tape hydrophilic, therefore the surface energy of the cover film must be very high to induce spontaneous capillary action of aqueous samples such as body fluids.

SUMMARY

In a first aspect, an article is provided. The article includes a) a first polymeric layer having a first major surface that is substantially planar and an opposing second major surface; and b) a second polymeric layer bonded to the first polymeric layer. The second polymeric layer has a first major surface and a second major surface, and the first major surface of the second polymeric layer is conformal to the second major surface of the first polymeric layer. The second major surface of the second polymeric layer defines a cavity including at least one wall. The second polymeric layer has a channel connecting the cavity to at least one edge of the second polymeric layer. A surface of the cavity exhibits an advancing contact angle with water of less than 90 degrees.

In a second aspect, another article is provided. The article includes a) a first polymeric layer having a first major surface that is substantially planar and an opposing second major surface; and b) a second polymeric layer bonded to the first polymeric layer. The second polymeric layer has a first major surface and a second major surface, and the first major surface of the second polymeric layer is conformal to the second major surface of the first polymeric layer. The second major surface of the second polymeric layer defines a cavity comprising at least one wall. The second polymeric layer has a channel connecting the cavity to the first major surface of the first polymeric layer. A surface of the cavity exhibits an advancing contact angle with water of less than 90 degrees.

In a third aspect, a method of making an article of the first aspect or the second aspect is provided. The method includes a) obtaining a tool comprising protruding features; b) disposing a first polymer on the protruding features; c) disposing a second polymer on the first polymer; and d) applying compression to the polymeric tooling, the first polymer, and the second polymer at an elevated temperature to form the article. The second polymer forms the first polymeric layer of the article and the first polymer forms the second polymeric layer of the article.

In a fourth aspect, another method of making an article is provided. The method includes a) obtaining a tool comprising protruding features; b) disposing a first polymer on the protruding features; c) disposing a second polymer on the first polymer; d) applying compression to the polymeric tooling, the first polymer, and the second polymer at an elevated temperature to form the article, wherein the second polymer forms a first polymeric layer of the article and the first polymer forms a second polymeric layer of the article; e) disposing a third layer on the second polymeric layer, the third layer disposed on a first major surface of the third layer and the first major surface being in contact with the second polymeric layer; and f) applying compression to the second polymeric layer at an elevated temperature to bond the second polymeric layer to the third layer. The article includes 1) a first polymeric layer having a first major surface that is substantially planar and an opposing second major surface; 2) a second polymeric layer bonded to the first polymeric layer; and 3) a third layer bonded to the second polymeric layer. The second polymeric layer has a first major surface and a second major surface and the first major surface of the second polymeric layer is conformal to the second major surface of the first polymeric layer. The second major surface of the second polymeric layer defines a cavity including at least one wall. The second polymeric layer has a channel connecting the cavity to at least one edge of the second polymeric layer or to the first major surface of the first polymeric layer. A surface of the cavity exhibits an advancing contact angle with water of less than 90 degrees. A surface of the third layer and the cavity of the second polymeric layer together define a chamber.

It has been discovered that methods of the present disclosure simplify the process for manufacturing diagnostic devices by reducing the number of input materials required. Moreover, articles made according to at least certain embodiments of this disclosure were found to show one or more advantageous properties of increased performance by using precise, lower volumes of sample than could be achieved by current fabrication methods.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

Figure 1A:
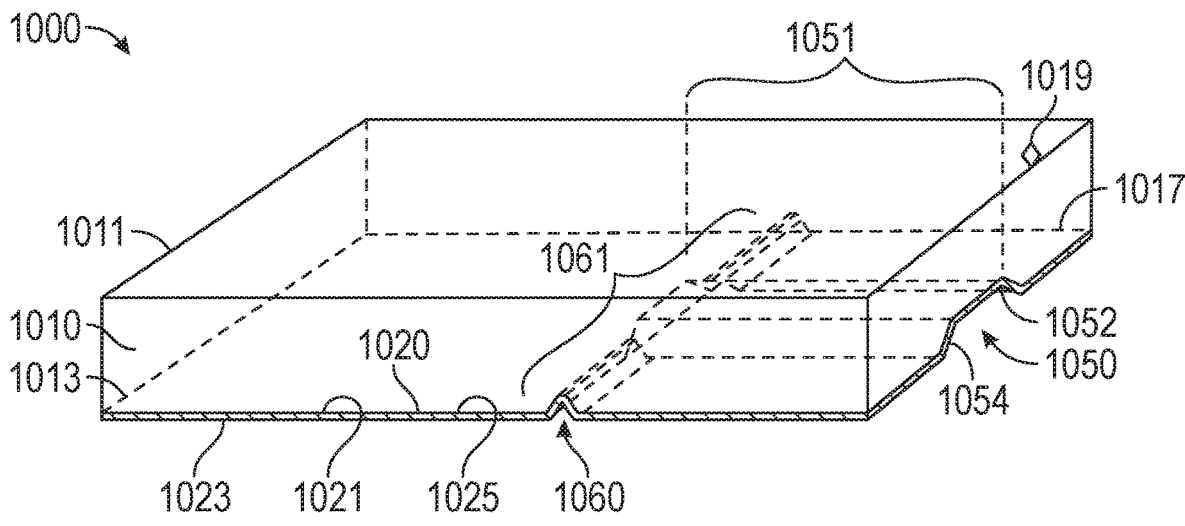
FIG. 1A is a generalized schematic diagram of an exemplary article.

While the above-identified figures set forth several embodiments of the disclosure other embodiments are also contemplated, as noted in the description. The figures are not necessarily drawn to scale. In all cases, this disclosure presents the invention by way of representation and not limitation.

DETAILED DESCRIPTION OF ILLUSTRATIVE EMBODIMENTS

As used herein, the term "essentially free" in the context of a composition being essentially free of a component, refers to a composition containing less than 1% by weight (wt. %), 0.5 wt. % or less, 0.25 wt. % or less, 0.1 wt. % or less, 0.05 wt. % or less, 0.001 wt. % or less, or 0.0001 wt. % or less of the component, based on the total weight of the composition. The term "essentially free" in the context of a feature of a structure (e.g., a surface of a layer), refers to a structure having less than 5% by area of the component, 4% or less, 3% or less, 2% or less, or 1% or less by area of the component, based on the total area of the structure.

As used herein, the term "polymeric" refers to containing at least one polymer.

As used herein, the term "cavity" refers to an empty space, which is defined by at least one wall of a (e.g., solid) object.

As used herein, the term "chamber" refers to a cavity that is enclosed by at least one additional wall.

As used herein, the term "channel" refers to a passageway that allows gas or liquid to exit a cavity or chamber.

As used herein, the term "dimensionally stable" refers to the ability of a material (e.g., article or polymeric layer) to maintain its size and shape, even under varying environmental conditions and strains.

As used herein, the term "glass transition temperature" ($T_g$), of a polymer refers to the transition of a polymer from a glassy state to a rubbery state and can be measured using Differential Scanning calorimetry (DSC), such as at a heating rate of 10° C. per minute in a nitrogen stream. When the $T_g$ of a monomer is mentioned, it is the $T_g$ of a homopolymer of that monomer. The homopolymer must be sufficiently high molecular weight such that the $T_g$ reaches a limiting value, as it is generally appreciated that a $T_g$ of a homopolymer will increase with increasing molecular weight to a limiting value. The homopolymer is also understood to be substantially free of moisture, residual monomer, solvents, and other contaminants that may affect the $T_g$. A suitable DSC method and mode of analysis is as described in Matsumoto, A. et. al., J. Polym. Sci. A., Polym. Chem. 1993, 31, 2531-2539.

As used herein, the term "Vicat softening temperature" of a polymer refers to the determination of the softening point for a material that has no definite melting point. It is taken as the temperature at which the specimen is penetrated to a depth of 1 mm by a flat-ended needle with a under a specific load.

As used herein, the term "hydrophilic" refers to a surface that is wet by aqueous solutions and does not express whether or not the material absorbs aqueous solutions. By "wet" it is meant that the surface exhibits an advancing (maximum) water contact angle of less than 90°, preferably 45° or less. As used herein, the term "hydrophobic" refers to a surface that exhibits an advancing water contact angle of 90° or greater.

As used herein, the term "fiducial" refers to a structure or mark that provides a fixed basis of comparison.

As used herein, "curing" means the hardening or partial hardening of a composition by any mechanism, e.g., by heat, light, radiation, e-beam, microwave, chemical reaction, or combinations thereof. As used herein, the term "hardenable" refers to a material that can be cured or solidified, e.g., by heating to remove solvent, heating to cause polymerization, chemical crosslinking, radiation-induced polymerization or crosslinking, or the like. As used herein, "cured" refers to a material or composition that has been hardened or partially hardened (e.g., polymerized or crosslinked) by curing.

As used herein, "substantially planar" with respect to a layer means that a surface of the layer is essentially free of recesses and/or protrusions extending above and/or below a plane of the layer, the recesses and/or protrusions having a depth or height of greater than 100 micrometers, 90 micrometers, 80 micrometers, 70 micrometers, 60 micrometers, 50 micrometers, 40 micrometers, 30 micrometers, 25 micrometers, 20 micrometers, 15 micrometers, 10 micrometers, 9 micrometers, 8 micrometers, 7 micrometers, 6 micrometers, 5 micrometers, 4 micrometers, 3 micrometers, 2 micrometers, or greater than 1 micrometer. Typically, recesses and/or protrusions have a depth or height of less than 1 millimeter, such as 900 micrometers or less, 800 micrometers, 700 micrometers, 600 micrometers, 500 micrometers, 400 micrometers, or 300 micrometers or less. The depth or height of a recesses or protrusion present on a layer surface can be measured with a confocal microscope.

As used herein, "thermoplastic" refers to a polymer that flows when heated sufficiently above its glass transition point and become solid when cooled.

As used herein, "thermoset" refers to a polymer that permanently sets upon curing and does not flow upon subsequent heating. Thermoset polymers are typically cross-linked polymers.

As used herein, "transparent" refers to a material (e.g., a layer) that has at least 50% transmittance, 70% transmittance, or optionally greater than 90% transmittance over at least the 400 nanometer (nm) to 700 nm portion of the visible light spectrum.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

In this application, terms such as "a", "an", and "the" are not intended to refer to only a singular entity, but include the general class of which a specific example may be used for illustration. The terms "a", "an", and "the" are used interchangeably with the term "at least one." The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise. The term "and/or" means one or all of the listed elements or a combination of any two or more of the listed elements.

Also herein, all numbers are assumed to be modified by the term "about" and preferably by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used.

As used herein as a modifier to a property or attribute, the term "generally", unless otherwise specifically defined, means that the property or attribute would be readily recognizable by a person of ordinary skill but without requiring absolute precision or a perfect match (e.g., within +/−20% for quantifiable properties). The term "substantially", unless otherwise specifically defined, means to a high degree of approximation (e.g., within +/−10% for quantifiable properties) but again without requiring absolute precision or a perfect match. Terms such as same, equal, uniform, constant, strictly, and the like, are understood to be within the usual tolerances or measuring error applicable to the particular circumstance rather than requiring absolute precision or a perfect match.

In a first aspect, the present disclosure provides an article. The article comprises:

a) a first polymeric layer having a first major surface that is substantially planar and an opposing second major surface; and b) a second polymeric layer bonded to the first polymeric layer, the second polymeric layer having a first major surface and a second major surface, wherein the first major surface of the second polymeric layer is conformal to the second major surface of the first polymeric layer, wherein the second major surface of the second polymeric layer defines a cavity comprising at least one wall, wherein the second polymeric layer has a channel connecting the cavity to at least one edge of the second polymeric layer, and wherein a surface of the cavity exhibits an advancing contact angle with water of less than 90 degrees.

In a second aspect, the present disclosure provides another article. The article comprises:

a) a first polymeric layer having a first major surface that is substantially planar and an opposing second major surface; and b) a second polymeric layer bonded to the first polymeric layer, the second polymeric layer having a first major surface and a second major surface, wherein the first major surface of the second polymeric layer is conformal to the second major surface of the first polymeric layer, wherein the second major surface of the second polymeric layer defines a cavity comprising at least one wall, wherein the second polymeric layer has a channel connecting the cavity to the first major surface of the first polymeric layer, and wherein a surface of the cavity exhibits an advancing contact angle with water of less than 90 degrees.

Articles according to at least certain embodiments of the present disclosure provide a multilayered, melt bondable, spontaneous capillary microfluidic article that may be useful, for instance, for liquid sample acquisition. Suitable applications include, for example, bodily fluid acquisition for diagnostic devices (e.g., blood glucose strips) and medical wearables (e.g., sweat sensors). For instance, blood glucose test strips are a type of disposable point of care sensor designed to analyze small volumes of blood, for instance from a stick to a person's finger. The strips generally include a bottom sensor layer laminated to multiple film layers configured to form a small chamber for the blood to enter the strip and be exposed to the sensor chemistry.

It has been discovered that certain molding processes are capable of generating polymeric layers with heat-bondable structures having low dead volume vent features to overcome at least one limitation of current methods of making fluidic devices. Advantageously, the heat bonding process can be adapted to minimize inactivation of any sensor chemistry present (e.g., reagent(s)) while achieving high adhesion strength. Further, the capillary force of the structures can be enhanced by utilizing at least one hydrophilic wall and/or a cross sectional geometry with sidewall angles less than 90 degrees. Incorporation of these features in a structure according to at least certain embodiments of the present disclosure simplifies device assembly by reducing the number of input materials required to form the sample chamber to a single mechanically robust article.

Referring to FIG. 1A, an article 1000 according to the first aspect comprises a first polymeric layer 1010 having a first major surface 1011 that is substantially planar and an opposing second major surface 1013; and a second polymeric layer 1020 bonded to the first polymeric layer 1010, the second polymeric layer 1020 having a first major surface 1021 and a second major surface 1023, wherein the first major surface 1021 of the second polymeric layer 1020 is conformal to the second major surface 1013 of the first polymeric layer 1010, wherein the second major surface 1023 of the second polymeric layer 1020 defines a cavity 1050 comprising at least one wall 1054, wherein the second polymeric layer 1020 has a channel 1060 connecting the cavity 1050 to at least one edge 1025 of the second polymeric layer 1020, and wherein a surface 1052 of the cavity 1050 exhibits an advancing contact angle with water of less than 90 degrees. In the embodiment shown in FIG. 1A, the channel 1060 also connects the cavity 1050 to a second edge of the second polymeric layer 1020. In this embodiment, the channel 1060 is deep enough to extend through the second polymeric layer and into the first polymeric layer 1010, hence the channel 1060 also connects the cavity 1050 to a second edge 1017 of the first polymeric layer 1010. Also in the embodiment of FIG. 1A, the cavity 1050 has a first volume 1051, the channel 1060 of the second polymeric layer 1020 has a second volume 1061, and the second volume 1061 is 0.1% to 10% of the first volume 1051.

The first polymeric layer of the embodiment of FIG. 1A further comprises a fiducial mark 1019, namely a diamond-shaped mark located on the first major surface 1011 of the first polymeric layer 1010. A fiducial structure or mark advantageously provides a reference mark for improved alignment of the article during further manufacturing and/or processing steps. In certain embodiments, instead of a mark, a fiducial structure may be provided on the article. A fiducial structure, for instance, may be a three-dimensional structure formed on the article (e.g., during formation of the first or second polymeric layer).

Figure 1B:
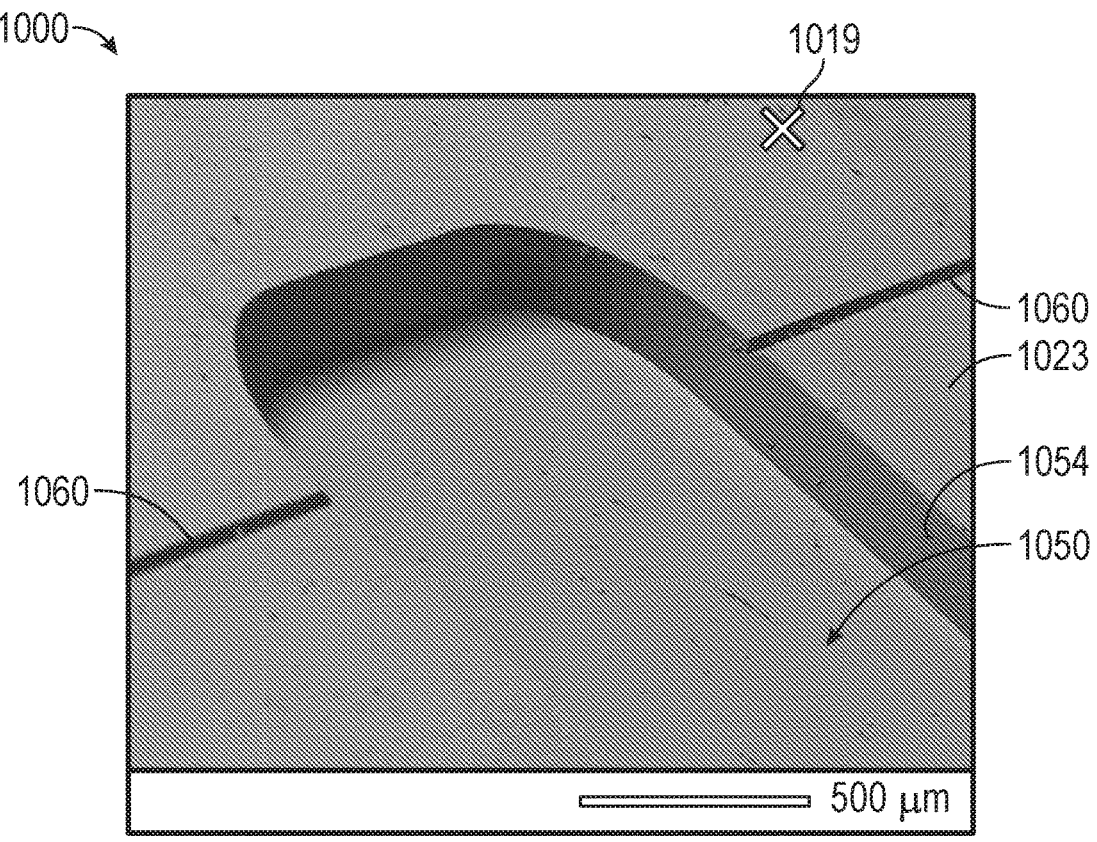
FIG. 1B is a scanning electron microscopy (SEM) image of a portion of an exemplary article.

Referring to FIG. 1B, a scanning electron microscopy (SEM) image is provided of a portion of an exemplary article 1000. In the image, some visible features of the article 1000 include a cavity 1050 defined by at least one wall 1054 of the second major surface 1023 of the second polymeric layer, and a channel 1060 connected to the cavity 1050 in opposing directions. Further, the second polymeric layer additionally includes a fiducial structure or mark 1019. In the embodiment shown in the figure, an "X" is provided as the fiducial mark 1019.

Figure 2A:
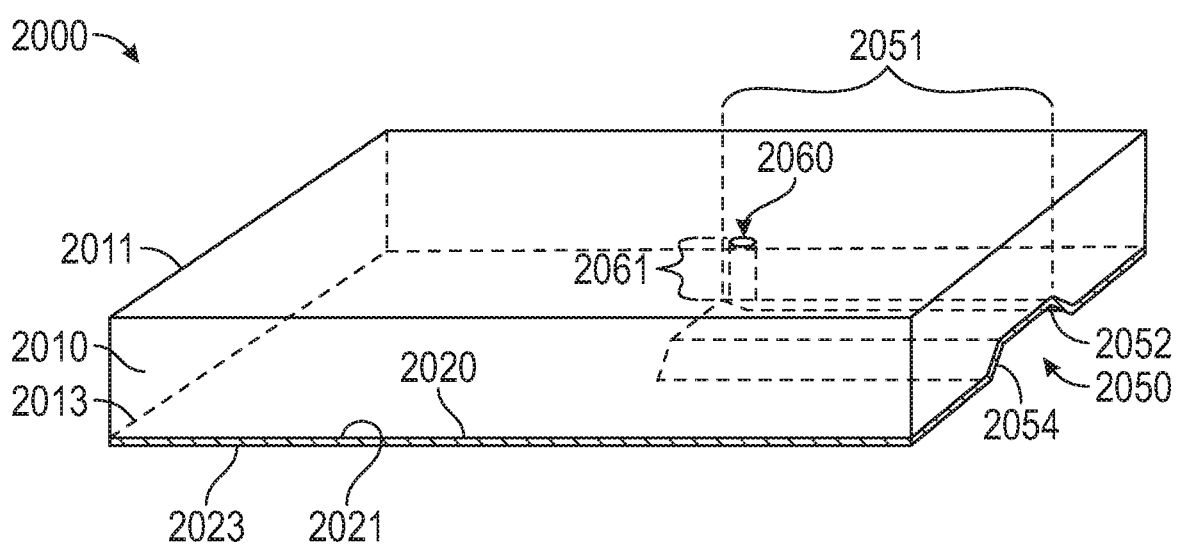
FIG. 2A is a generalized schematic diagram of another exemplary article.

Referring to FIG. 2A, an article 2000 according to the second aspect comprises a first polymeric layer 2010 having a first major surface 2011 that is substantially planar and an opposing second major surface 2013; and a second polymeric layer 2020 bonded to the first polymeric layer 2010, the second polymeric layer 2020 having a first major surface 2021 and a second major surface 2023, wherein the first major surface 2021 of the second polymeric layer 2020 is conformal to the second major surface 2013 of the first polymeric layer 2010, wherein the second major surface 2023 of the second polymeric layer 2020 defines a cavity 2050 comprising at least one wall 2054, wherein the second polymeric layer 2020 has a channel 2060 connecting the cavity 2050 to the first major surface 2011 of the first polymeric layer 2010, and wherein a surface 2052 of the cavity 2050 exhibits an advancing contact angle with water of less than 90 degrees. In the embodiment shown in FIG. 2A, the channel 2060 has a generally cylindrical shape, which can be formed, for example, using laser drilling through the first and second polymeric layers 2010 and 2020, respectively. Also in the embodiment of FIG. 2A, the cavity 2050 has a first volume 2051, the channel 2060 of the second polymeric layer 2020 has a second volume 2061, and the second volume 2061 is 0.001% to 0.1% of the first volume 2051.

Figure 2B:
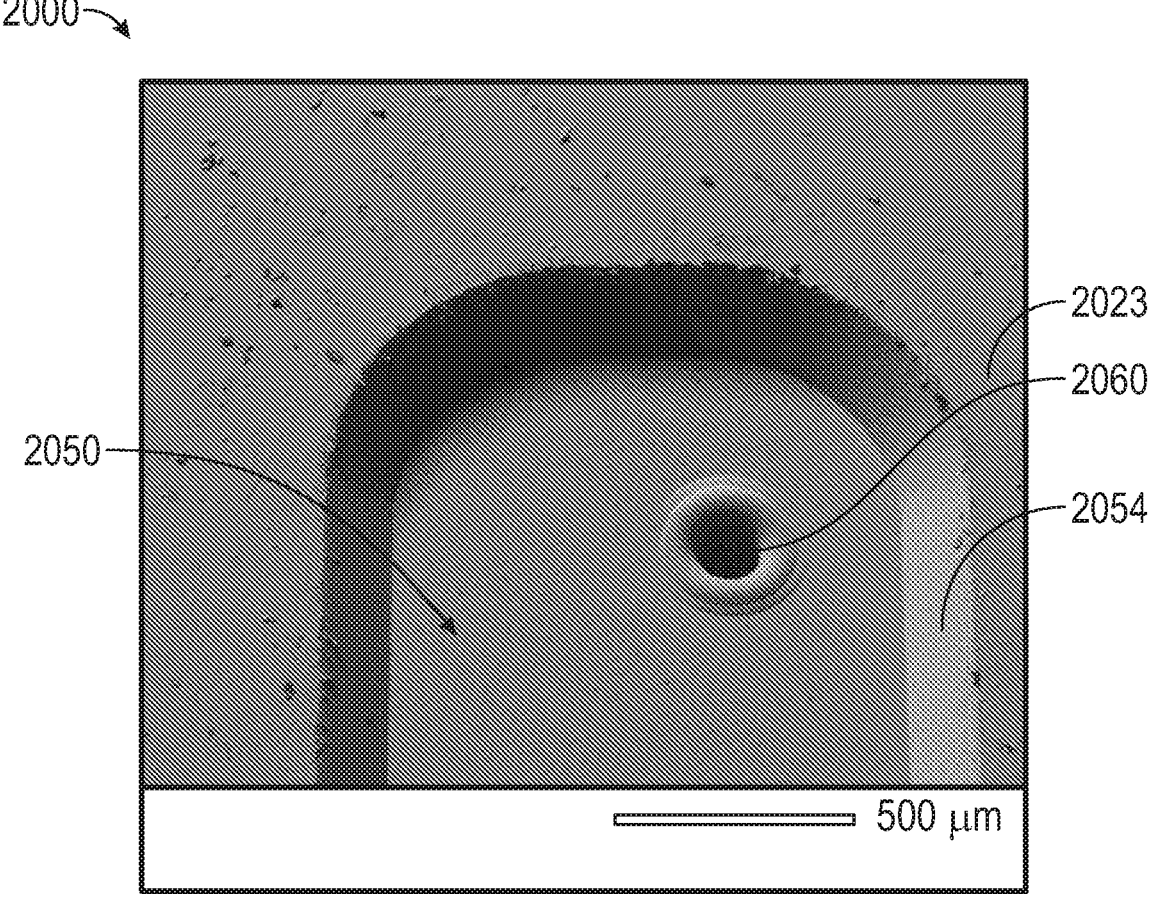
FIG. 2B is an SEM image of a portion of the exemplary article of Example 6.

Referring to FIG. 2B, a scanning electron microscopy (SEM) image is provided of a portion of an exemplary article 2000, prepared according to Example 6. In the image, some visible features of the article 2000 include a cavity 2050 defined by at least one wall 2054 of the second major surface 2023 of the second polymeric layer, and a channel 2060 connected to the cavity 2050. The channel may be formed, for example, by laser drilling through the first polymeric layer and the second polymeric layer to the cavity.

As the first polymeric layer has a second major surface that is conformal with first major surface of the second polymeric layer, it is to be understood that the second major surface of the first polymeric layer typically contains the same cavity and channel features as described throughout this disclosure with respect to the first major surface of the second polymeric layer. In some embodiments, however, the channel feature height is smaller than the second polymeric layer thickness such that the channel feature is only formed in the second polymeric layer.

Suitable polymeric materials for the first polymeric layer include for instance and without limitation, a polyolefin (e.g., high density polyethylene (HDPE), medium density polyethylene (MDPE), or low density polyethylene (LDPE)), a polyester, a polyamide, a poly(vinyl chloride), a polyether ester, a polyimide, a polyesteramide, a polyacrylate, a polyvinylacetate, or a hydrolyzed derivative of polyvinylacetate. In certain embodiments, polyolefins are preferred because of their excellent physical properties, ease of processing (e.g., replicating the surface of a tool), and typically low cost. Also, polyolefins are generally tough, durable and hold their shape well, thus being easy to handle after article formation. In select embodiments, the first polymeric layer includes the polyester polyethylene terephthalate (PET). One suitable commercially available PET is a 5 mil (127 micrometer) thick PET sheet from Tekra (New Berlin, WI) under the trade designation "MELINEX 454". A suitable commercially available LDPE is from The Dow Chemical Company (Midland Michigan) under the trade designation "DOW 9551 LDPE".

Preferably, the first polymeric layer has a maximum thickness of 500 micrometers, 475 micrometers, 450 micrometers, 425 micrometers, 400 micrometers, 375 micrometers, 350 micrometers, 325 micrometers, 300 micrometers, 275 micrometers, 250 micrometers, 225 micrometers, 200 micrometers, or 175 micrometers; and a minimum thickness of 50 micrometers, 75 micrometers, 100 micrometers, 125 micrometers, or 150 micrometers.

Suitable polymeric materials for the second polymeric layer include for instance and without limitation, a low density polyethylene, ethylene vinyl acetate, a polyurethane, copolymers of a polyester and a polyolefin, copolymers of a polyurethane and an aromatic poly(meth)acrylate, copolymers of a polycaprolactone and a polyurethane, or a combination thereof. One suitable commercially available polyurethane if from Lubrizol (Wickliffe, OH) under the trade designation "PEARLBOND 1160L". A suitable commercially available ethylene vinyl acetate (EVA) is from The Dow Chemical Company under the trade designation "DUPONT ELVAX 3180". Further, various additives may be included in the second polymeric layer, for example surface energy modifiers (such as surfactants and hydrophilic polymers), plasticizers, antioxidants, pigments, release agents, antistatic agents, and the like.

In any embodiment, the average thickness of the second polymeric layer is 5 micrometers or more, 7.5 micrometers, 10 micrometers, 12.5 micrometers, 15 micrometers, 17.5 micrometers, or 20 micrometers or more; and 50 micrometers or less, 45 micrometers, 40 micrometers, 35 micrometers, 30 micrometers, or 25 micrometers or less. Stated another way, the second polymeric layer may have an average thickness of 5 micrometers to 50 micrometers. The average thickness may be determined by measuring the thickness in at least 5 places, located at least 0.5 millimeters apart from each other, and taking the average of all of the measured thicknesses.

In certain embodiments, the second polymeric layer has a Vicat softening temperature ($T_g$) of 100 degrees Celsius (° C.) or less, 95° C., 90° C., 85° C., 80° C., 75° C., or 70° C.

or less; and 45° C. or more, 50° C., 55° C., 60° C., or 65° C. or more. The Vicat softening temperature of the second polymeric layer is often at least 10% lower than the Vicat softening temperature of the first polymeric layer, 15% lower, 20% lower, 25% lower, 30% lower, 35% lower, or at least 40% lower than the Vicat softening temperature of the first polymeric layer. In certain embodiments, the first polymeric layer has a Vicat softening temperature ($T_g$) of 150 degrees Celsius (° C.) or less, 145° C., 140° C., 130° C., 120° C., 115° C., or 110° C. or less; and 65° C. or more, 70° C., 75° C., 80° C., or 85° C. or more. Using a first polymeric layer with a higher Vicat softening temperature than the second polymeric layer assists in conforming the second polymeric layer to the first polymeric layer while the first polymeric layer maintains its substantially planar first major surface.

In some embodiments, the first polymeric layer, the second polymeric layer, or both, are transparent to visible light (as defined above). Providing one or more transparent layers can be advantageous for certain applications in which a sample reaction can be optically detected through at least a portion of the article.

In preferred embodiments, the article is advantageously dimensionally stable with a strain less than 50%, 40%, 30%, 20%, 15%, 10%, or less than 5%, at a temperature of 25 degrees Celsius (° C.). As used herein, "strain" refers to a stretch ratio or an extension ratio. It is defined as the ratio between the final length l and the initial length L of the material line in any particular direction. For instance, an elongation of 50%=1.5 L. Dimensional stability helps to resist deformation of features of the article (e.g., cavity, channel, and optional additional layer(s)) when the article is handled, decreasing the likelihood of damaging the structure before or during use.

Articles according to at least certain embodiments of the present disclosure are capable of spontaneously and uniformly transporting liquids (e.g., water, urine blood or other aqueous solutions) along an axis of the cavity of the second polymeric layer, from the open end towards the distal end. This capability is often referred to as wicking. Two general factors that influence the ability of layers to spontaneously transport liquids are (i) the structure or topography of the surface (e.g., capillarity, shape of the cavity) and (ii) the nature of the cavity surface (e.g., surface energy). To achieve the desired amount of fluid transport capability a designer may adjust the structure or topography of the second polymeric layer and/or adjust the surface energy of the second polymeric layer surface. In order to achieve wicking, the surface of the cavity must be capable of being "wet" by the liquid to be transported. Generally, the susceptibility of a solid surface to be wet by a liquid is characterized by the contact angle that the liquid makes with the solid surface after being deposited on a horizontally disposed surface and allowed to stabilize thereon. This angle is sometimes referred to as the "static equilibrium contact angle," and sometimes referred to herein merely as "advancing contact angle." As defined above, a material is hydrophilic if it has an advancing contact angle of less than 90 degrees.

Hydrophilicity can be achieved through one or more of material selection, additives included in the material, or surface treatment. In some embodiments, the cavity of the second polymeric layer has a surface including a surfactant, a surface treatment, a hydrophilic polymer, or a combination thereof. Suitable surfactants include for instance and without limitation, C8-C18 alkane sulfonates; C8-C18 secondary alkane sulfonates; alkylbenzene sulfonates; C8-C18 alkyl sulfates; alkylether sulfates; sodium laureth 4 sulfate;

sodium laureth 8 sulfate; dioctylsulfosuccinate, sodium salt; lauroyl lacylate; stearoyl lactylate; or any combination thereof. One or more surfactants can be applied by conventional methods, such as by wiping a coating of the surfactant on the surface of the second polymeric layer and allowing the coating to dry. A suitable surface treatment includes a hydrophilic coating comprising plasma deposited silicon/oxygen materials and/or diamond-like glass (DLG) materials. Plasma deposition of each of silicon/oxygen materials and DLG material is described, for instance, in PCT Publication No. WO 2007/075665 (Somasiri et al.). Further, examples of suitable DLG materials are disclosed in U.S. Pat. No. 6,696,157 (David et al.), U.S. Pat. No. 6,881,538 (Haddad et al.), and U.S. Pat. No. 8,664,323 (Iyer et al.). Suitable hydrophilic polymers include for instance and without limitation, a polyester, a polyamide, a polyurethane, a poly(vinyl alcohol), a poly(alkylene glycol), a poly(alkylene oxide), a poly(vinyl pyrrolidone), a rubber elastomer, or any combination thereof.

Figure 3:
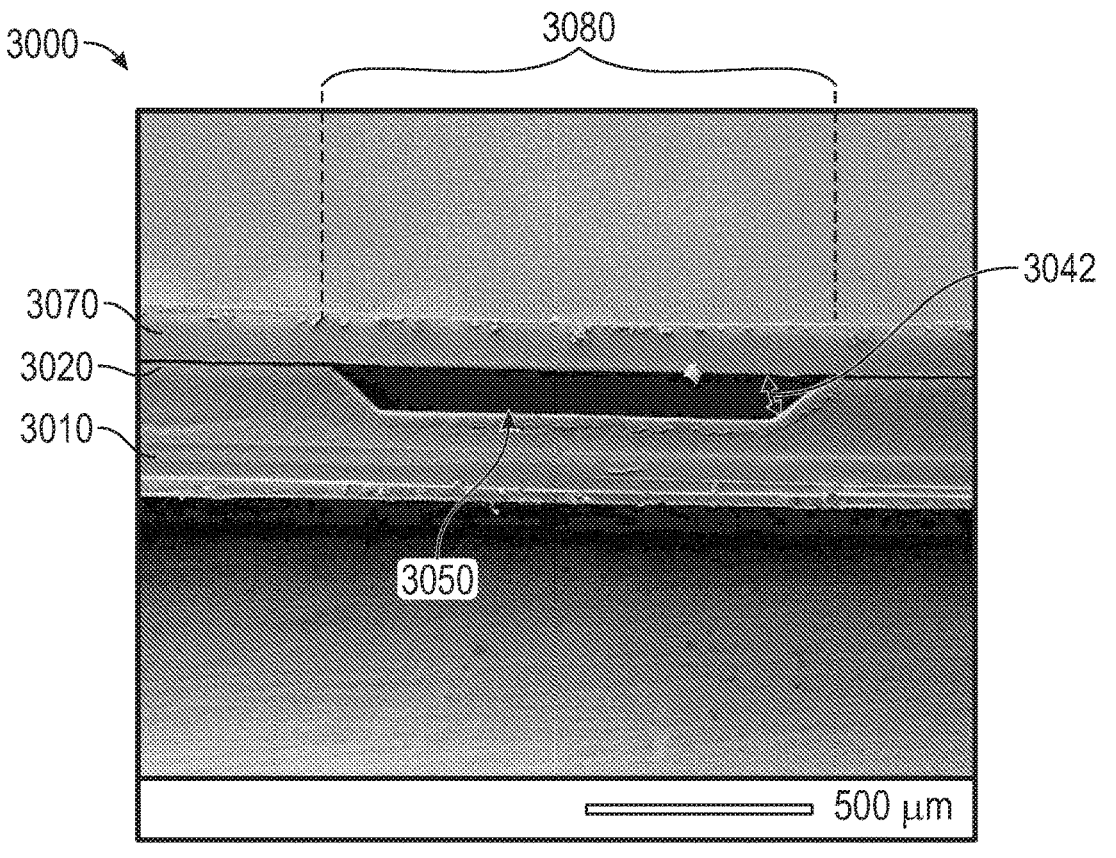
FIG. 3 is an SEM image of a portion of the exemplary article of Example 5.

Referring to FIG. 3, a scanning electron microscopy image is provided of a cross-section of an article 3000, prepared according to Example 5. In addition to a first polymeric layer 3010 and a second polymeric layer 3020, the article 3000 further comprises a third layer 3070 bonded to the second polymeric layer 3020. A cavity 3050 is present, including three walls of the second polymeric layer 3020 (e.g., a first side wall, a second side wall, and an upper wall or a lower wall, depending on the orientation of the article). In this embodiment, the third layer 3070 together with the cavity 3050 forms a chamber 3080, which has a cross-section with a trapezoidal shape. Moreover, an angle 3042 of less than 90 degrees, formed between the third layer 3070 and a wall of the cavity 3050, can serve as a source for additional capillary action.

Typically, the third layer 3070 includes a reagent (not shown), for instance a reagent disposed on a major surface of the third layer 3070. The reagent is preferably configured to react with a sample and provide at least one response selected from the response types of electrochemical, optical, fluorescent, or chemiluminescent. Some suitable reagents include for instance and without limitation, fluorogenic or chromogenic indicators, electrochemical reagents, agglutination reagents, analyte specific binding agents, amplification agents such as enzymes and catalysts, photochromic agents, dielectric compositions, analyte specific reporters such as enzyme-linked antibody probes, DNA probes, RNA probes, fluorescent or phosphorescent beads, or any combination thereof. The third layer often further comprises a detector. In select embodiments, the detector comprises an electrode disposed on a first major surface of the third layer. In such embodiments, the chamber is in fluid communication with the electrode. For a device application of a blood glucose test strip, for instance, blood from a finger prick enters the chamber, contacts the reagent, and a response from the reaction of the reagent with the blood is measured by the detector.

Figure 4:
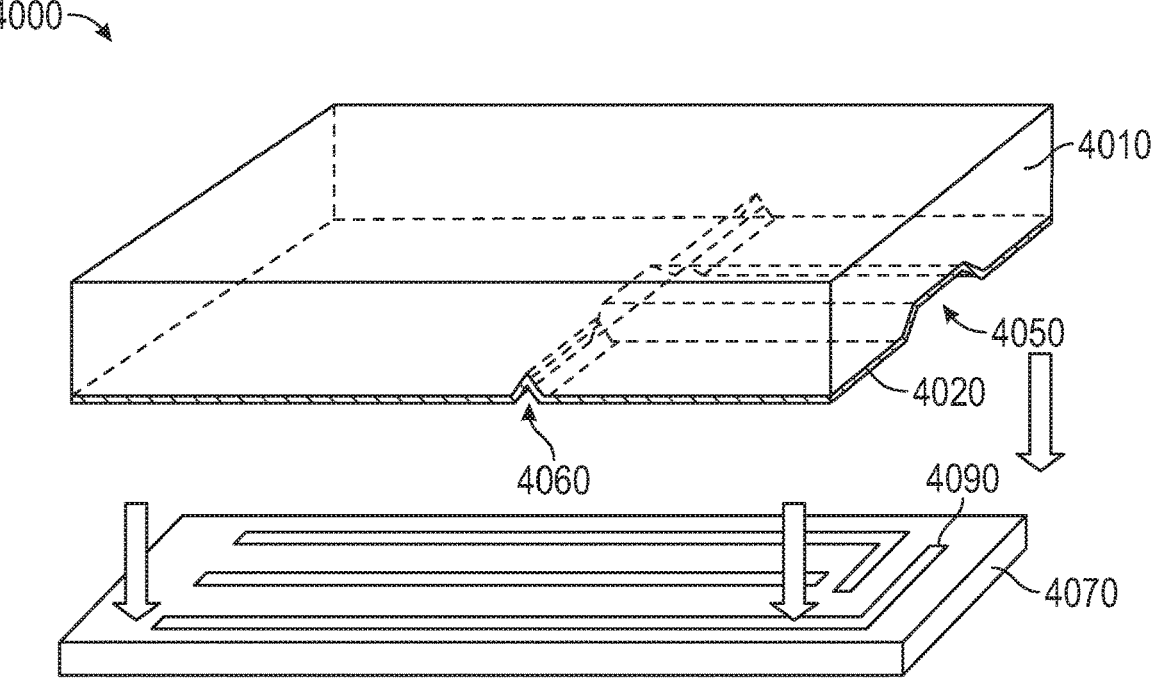
FIG. 4 is an exploded generalized schematic diagram of a further exemplary article.

Referring to FIG. 4, an exploded generalized schematic diagram of an exemplary article is provided. The article 4000 comprises a first polymeric layer 4010; and a second polymeric layer 4020 bonded to and conformal with a major surface of the first polymeric layer 4010. The second polymeric layer 4020 defines a cavity 4050. The second polymeric layer 4020 further has a channel 4060 connecting the cavity 4050 to two opposing edges of each of the first polymeric layer 4010 and the second polymeric layer 4020. FIG. 4 additionally shows a third layer 4070 comprising a detector 4090, which includes a reagent (not shown). A device according to certain embodiments of the present disclosure comprises the third layer 4070 connected to (e.g., bonded to) the second layer 4020, generally around the perimeter of the second layer 4020.

The material suitable for the third layer is not particularly limited, and may comprise a polymeric material, an inorganic material (e.g., silicon wafer, glass), or a ceramic material (e.g., aluminum oxide, aluminum nitride, zirconium oxide). Some suitable polymeric materials include for instance and without limitation, any of the polymers described above with respect to the first polymeric layer. In many embodiments, the second polymeric layer is hermetically sealed to the third layer, which minimizes leakage of sample from between the second polymeric layer and the third layer. The article optionally further comprises a tie layer disposed between the first polymeric layer and the second polymeric layer. Some suitable tie layers are as described in U.S. Pat. No. 10,098,980 (Karls et al.), including a thermoplastic composition comprising a copolymer of at least one olefin monomer and at least one polar monomer and/or a block copolymer comprising alkyl methacrylate and alkyl acrylate blocks. The tie layer may be applied in a pattern to prevent covering the sensor area.

Figure 5A:
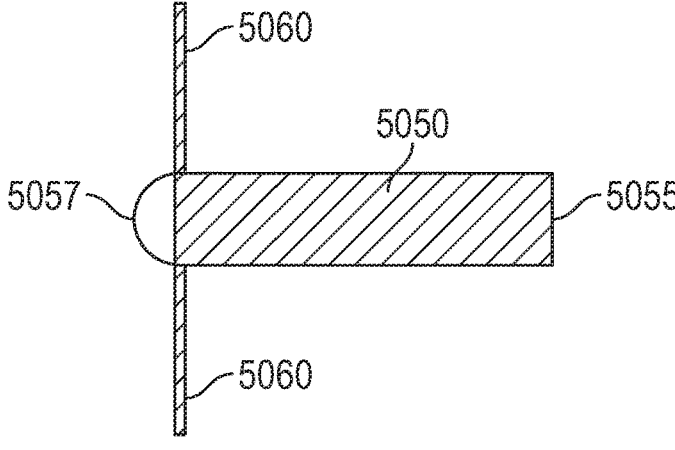
FIG. 5A is a schematic diagram of a portion of an exemplary article having a channel connected closer the distal end than the open end of a cavity.
Figure 5B:
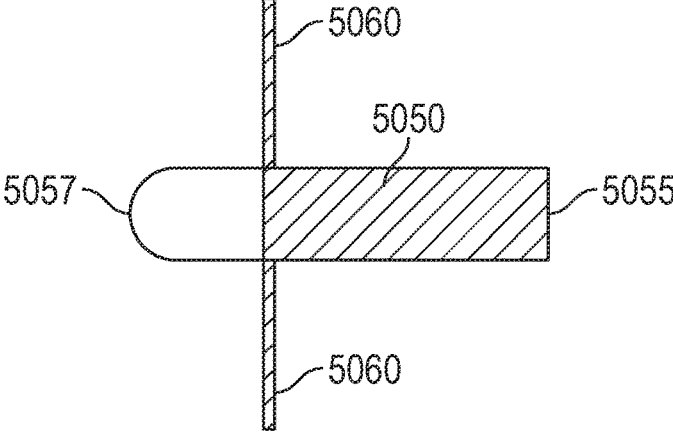
FIG. 5B is a schematic diagram of a portion of another exemplary article having a channel connected closer to the distal end than the open end of a cavity.
Figure 5C:
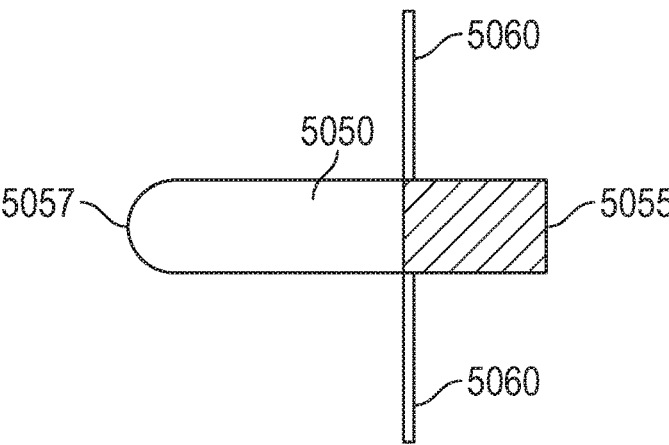
FIG. 5C is a schematic diagram of a portion of an exemplary article having a channel connected closer to the open end than the distal end of a cavity.

Referring to FIG. 5A, a schematic diagram of a portion of an exemplary article having a channel connected closer to the distal end than the open end of a cavity. In particular, a channel 5060 is located nearer to the distal end 5057 of the cavity 5050 than the open end 5055 of the cavity 5050. Referring to FIG. 5B, a schematic diagram of a portion of another exemplary article is provided. The channel 5060 in FIG. 5B is also connected closer to the distal end 5057 of the cavity 5050 than the open end 5055 of the cavity 5050, but not as close to the distal end 5057 as the channel 5060 in FIG. 5A. Referring to FIG. 5C, a schematic diagram is provided of a portion of an exemplary article having a channel 5060 connected closer to the open end 5055 of a cavity 5050 than the distal end 5057 of the cavity 5050. The positioning of a channel can be advantageously selected to set a distance into the cavity that a fluid will travel via capillary action, with the channel providing a venting function to allow air, displaced from the cavity by the entrance of fluid, to exit the article. When the channel is hydrophilic (i.e., exhibiting an advancing contact angle with water of 90 degrees or less), the fluid tends to travel from the cavity into the channel, such as illustrated in FIGS. 5A and 5B. Volume ratio of the channel to the cavity is of greater importance when the channel is hydrophilic, because wet out of the channel with sample decreases the amount of sample remaining in the cavity to be analyzed. When the channel is hydrophobic (i.e., exhibiting an advancing contact angle with water of greater than 90 degrees), however, travel of the fluid from the cavity into the channel is minimized, such as illustrated in FIG. 5C. For larger volumes of fluid to enter the cavity, a channel is placed closer to a distal end of the cavity. Concomitantly, for smaller volumes of fluid to enter the cavity, a channel is placed closer to an open end of the cavity. Lower fluid volumes can be desirable, for instance when testing a patient's blood. The amount of fluid needed for detection of an analyte of interest may dictate the minimum volume required for use of a device.

In some embodiments (e.g., the article shown in FIG. 1A), the channel of the second polymeric layer has a first side wall, a second side wall, and an upper (or lower) wall, wherein the first side wall and the second side wall are configured to each intersect with the upper (or lower) wall at an angle of less than 90 degrees. Alternatively, the channel of the second polymeric layer has a first side wall and a second side wall, which meet and form an angle between 10 degrees and 120 degrees (e.g., having a V-shape, as seen in the channel 4060 of FIG. 4). Optionally, the channel of the second polymeric layer has a length and a width, and a ratio of the length to the width is 50:1 or greater, 60:1, 70:1, 80:1, or 90:1 or greater; and 150:1 or less, 140:1, 130:1, 120:1, 110:1, or 100:1 or less. In some embodiments, the channel of the second polymeric layer has a height that is 0.1 mm or less, 0.090 mm, 0.080 mm, 0.070 mm, 0.060 mm, 0.050 mm, or 0.040 mm or less.

Figure 6A:
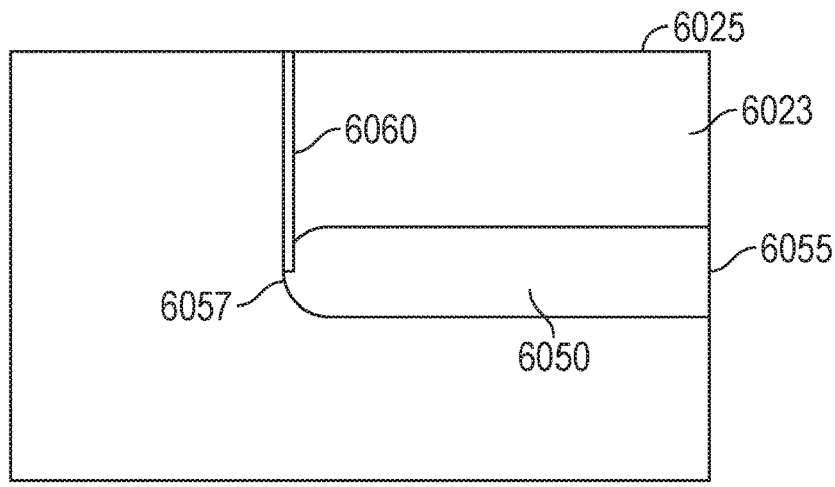
FIG. 6A is a schematic diagram of a portion of an exemplary article having a channel connecting the distal end of a cavity to a side edge of a layer.
Figure 6B:
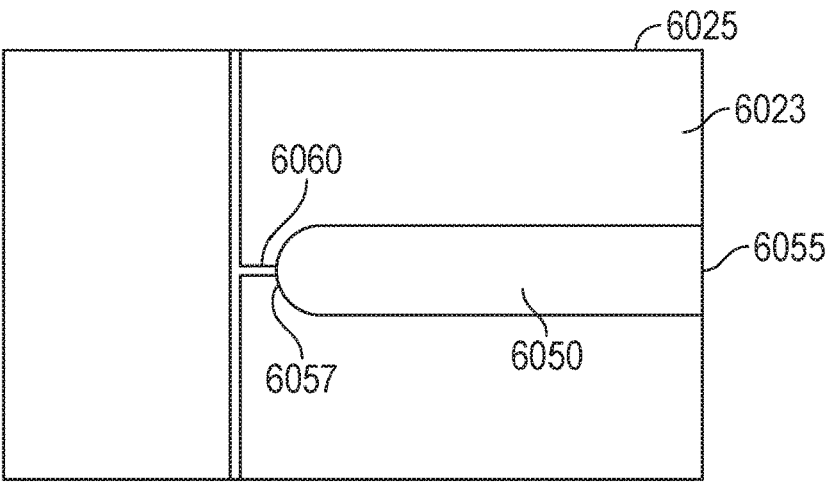
FIG. 6B is a schematic diagram of a portion of an exemplary article having a branched channel connecting the distal end of a cavity to two opposing side edges of a layer.
Figure 6C:
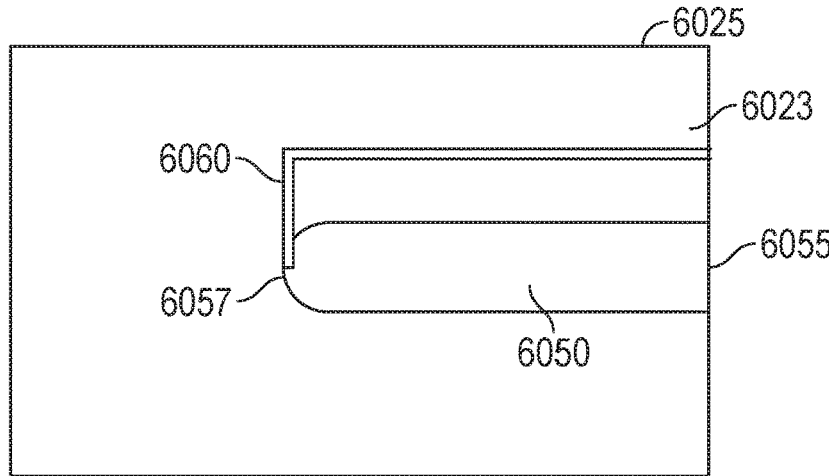
FIG. 6C is a schematic diagram of a portion of an exemplary article having a channel connecting the distal end of a cavity to an end edge of a layer.
Figure 6D:
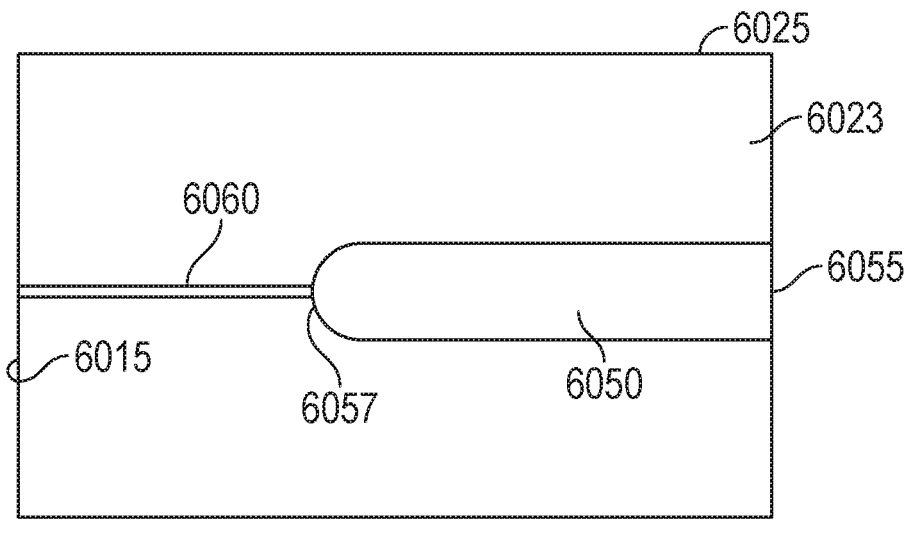
FIG. 6D is a schematic diagram of a portion of an exemplary article having a channel connecting the distal end of a cavity to another end edge of a layer.
Figure 6E:
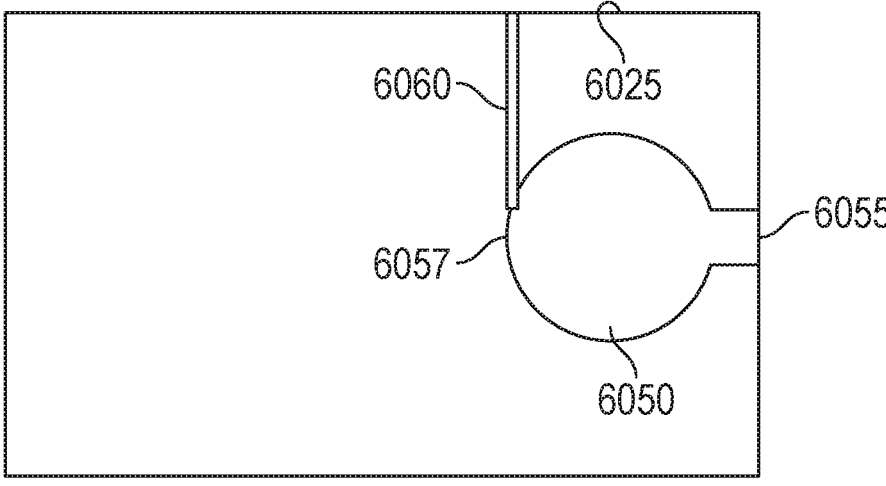
FIG. 6E is a schematic diagram of a portion of an exemplary article having a channel connecting the distal end of a cavity having a circular shape to a side edge of a layer.

The positioning of a channel to place a cavity in fluid (e.g., air) communication with one or more edges of a polymeric layer is not particularly limited. For instance, in an embodiment, the channel of the second polymeric layer connects the cavity to two edges of the second polymeric layer and optionally also the first polymeric layer (e.g., channel 1060 in FIG. 1A). Referring to FIGS. 6A-6E, various configurations are provided for illustration of several variations. FIG. 6A provides a schematic diagram of a portion of an exemplary article having a channel 6060 connecting the distal end 6057 (e.g., opposite of an open end 6055) of a cavity 6050 to a side edge 6025 of a layer. FIG. 6B provides a schematic diagram of a portion of an exemplary article having a branched channel 6060 connecting the distal end 6057 of a cavity 6050 to two opposing side edges 6025 of a layer. FIG. 6C provides a schematic diagram of a portion of an exemplary article having a channel 6060 connecting the distal end 6057 of a cavity 6050 to an end edge 6025 of a layer. FIG. 6D provides a schematic diagram of a portion of an exemplary article having a channel 6060 connecting the distal end 6057 of a cavity 6050 to another end edge 6025 of a layer. Further, the shape of the cavity can vary. For instance, FIG. 6E provides a schematic diagram of a portion of an exemplary article having a channel 6060 connecting the distal end 6057 of a cavity 6050 having a circular shape to a side edge 6025 of a layer.

Advantageously, the cavity of the second polymeric layer can be formed to have a volume of 1 microliter or less, 0.9 microliters, 0.8 microliters, 0.7 microliters, 0.6 microliters, 0.5 microliters, 0.4 microliters, 0.3 microliters, or 0.2 microliters or less, using methods according to the present disclosure. The cavity typically has a volume of 0.05 microliters or greater. In some embodiments, the cavity of the second polymeric layer has a length that is 8 millimeters (mm) or less, 6 mm, 5 mm, or 4 mm or less; and 0.5 mm or more, 1 mm, 2 mm, or 3 mm or more. Optionally, the cavity of the second polymeric layer has a height that is 0.2 mm or less, 0.15 mm, or 0.10 mm or less; and 0.01 mm or greater, 0.02 mm, 0.03 mm, 0.04 mm, or 0.05 mm or greater.

A surface of the third layer and the cavity of the second polymeric layer can together define a chamber. In some embodiments, the cavity of the second polymeric layer has a first side wall, a second side wall, and an upper (or lower) wall, which together with an edge of the third layer form a polygonal shape, such as a trapezoidal shape (e.g., the chamber can have a trapezoidal cross-section). The non-parallel walls of the trapezoid are often the first and second side walls of the second polymeric layer. In preferred embodiments, the first side wall and the second side wall are configured to each intersect with the upper (or lower) wall at an angle of less than 90 degrees, to assist in capillary movement of a sample entering the chamber.

Figure 7A:
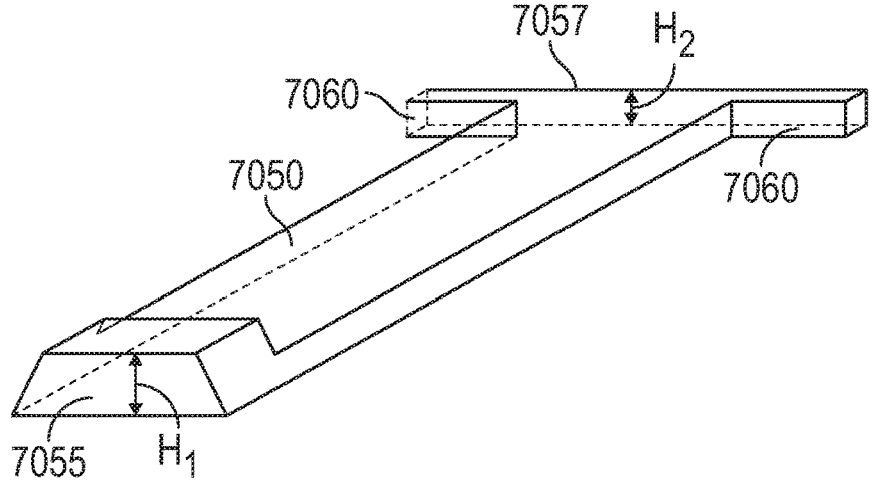
FIG. 7A is a schematic diagram of a portion of an exemplary article having a chamber with a height $H_1$ of an open end that is larger than a height $H_2$ of a distal end.
Figure 7B:
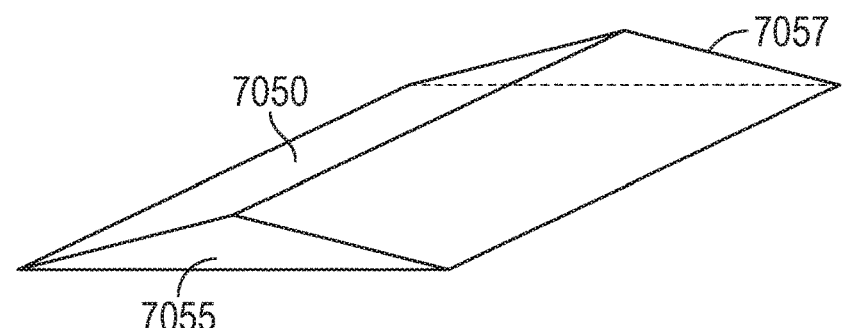
FIG. 7B is a schematic diagram of a portion of an exemplary article having a chamber having a triangular cross-section.
Figure 7C:
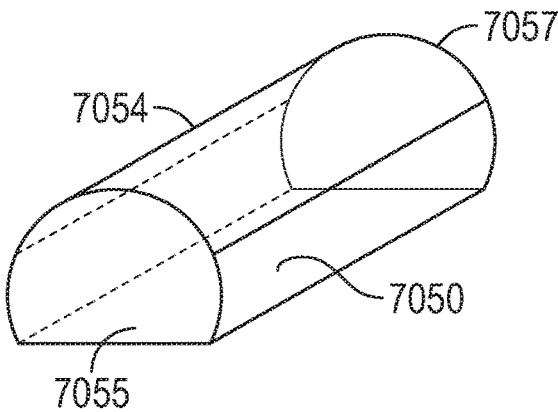
FIG. 7C is a schematic diagram of a portion of an exemplary article having a chamber in which the cavity is defined by one curved wall.

In some embodiments, the chamber has a height at an open end that is larger than a height at a closed end. For instance, referring to FIG. 7A, a schematic diagram is provided of a portion of an exemplary article having a chamber 7050 with a height $H_1$ of an open end 7055 that is larger than a height $H_2$ of a distal end 7057. In this embodiment, a channel 7060 also having a height $H_2$ is connected to the distal end 7057 of the chamber 7050. Such a configuration can advantageously provide an overall low volume chamber as well as a conveniently large opening for the introduction of a sample into the chamber. Referring to FIG. 7B, another chamber shape is shown that can provide a low volume configuration. In particular, FIG. 7B is a schematic diagram of a portion of an exemplary article having a chamber 7050 having a triangular cross-section at both an open end 7055 and at a distal end 7057. Stated another way, the cavity (of the second polymeric layer) has a first side wall and a second side wall, which together with an edge of the third layer form a triangular shape. In some embodiments, the cavity of the second polymeric layer has one wall that forms a curved shape. Referring to FIG. 7C, a schematic diagram is provided of a portion of an exemplary article having a chamber 7050 in which the cavity is defined by one curved wall 7054.

Methods

In a third aspect, a method of making an article is provided. The method comprises:

a) obtaining a tool comprising protruding features;

b) disposing a first polymer on the protruding features;

c) disposing a second polymer on the first polymer; and d) applying compression to the polymeric tooling, the first polymer, and the second polymer at an elevated temperature to form the article, wherein the second polymer forms the first polymeric layer of the article and the first polymer forms the second polymeric layer of the article.

In a fourth aspect, another method of making an article is provided. The method comprises:

a) obtaining a tool comprising protruding features;

b) disposing a first polymer on the protruding features;

c) disposing a second polymer on the first polymer;

d) applying compression to the polymeric tooling, the first polymer, and the second polymer at an elevated temperature to form the article, wherein the second polymer forms a first polymeric layer of the article and the first polymer forms a second polymeric layer of the article;

e) disposing a third layer on the second polymeric layer, the third layer disposed on a first major surface of the third layer and the first major surface being in contact with the second polymeric layer;

f) applying compression to the second polymeric layer at an elevated temperature to bond the second polymeric layer to the third layer;

wherein the article comprises:

1) a first polymeric layer having a first major surface that is substantially planar and an opposing second major surface;

2) a second polymeric layer bonded to the first polymeric layer, the second polymeric layer having a first major surface and a second major surface, wherein the first major surface of the second polymeric layer is conformal to the second major surface of the first polymeric layer, wherein the second major surface of the second polymeric layer defines a cavity comprising at least one wall, wherein the second polymeric layer has a channel connecting the cavity to at least one edge of the second polymeric layer or to the first major surface of the first polymeric layer, and wherein a surface of the cavity exhibits an advancing contact angle with water of less than 90 degrees; and 3) a third layer bonded to the second polymeric layer, wherein a surface of the third layer and the cavity of the second polymeric layer together define a chamber.

Figure 8:
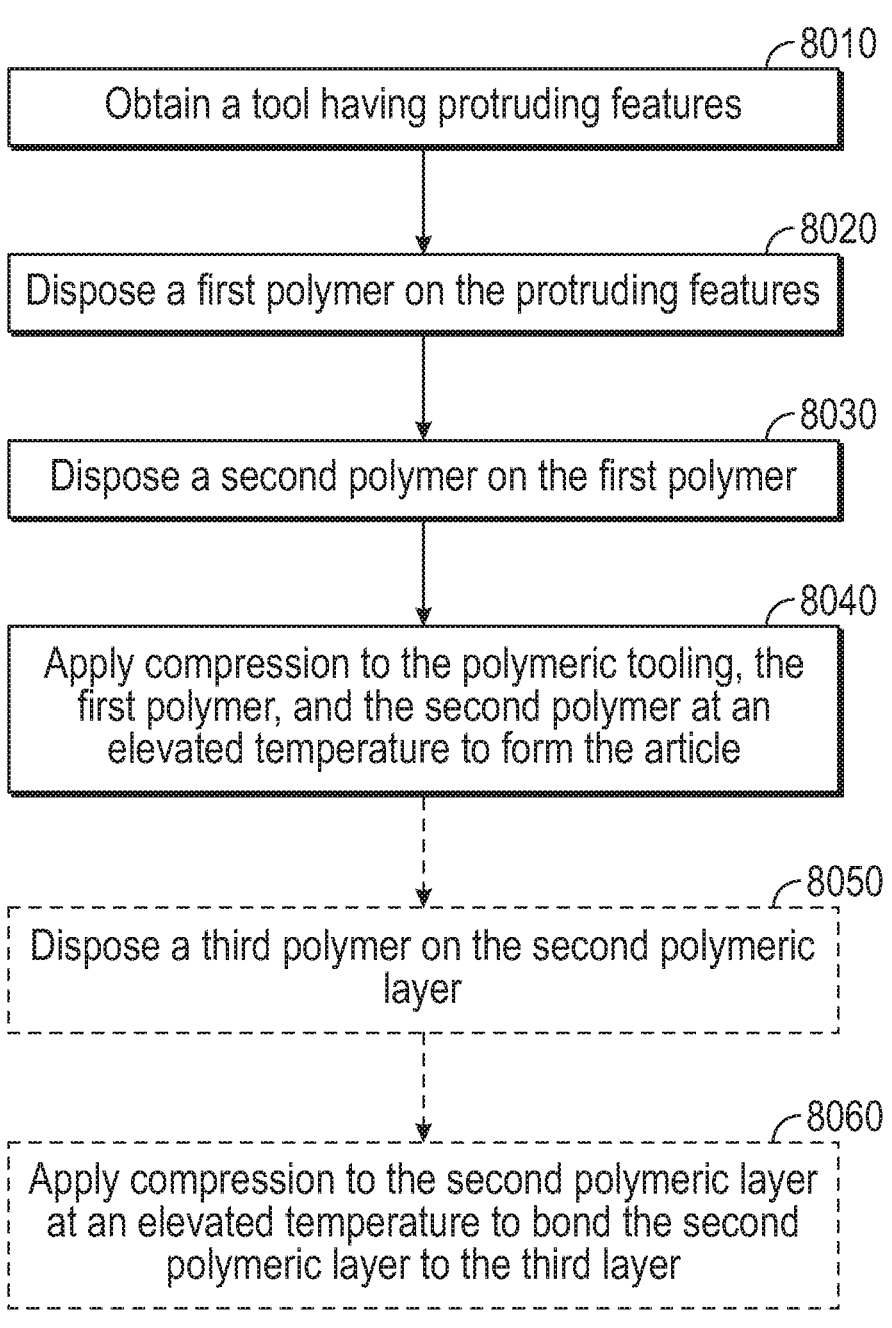
FIG. 8 is a flowchart of exemplary processes for making an article.

In some embodiments of the fourth aspect, the third layer comprises a third polymer and none of the first polymer, the second polymer, or the third polymer is a pressure sensitive adhesive. Typically, the methods of the third and/or fourth aspects make any of the articles according to the first and second aspects, described in detail above. A generalized flowchart of exemplary processes for making an article is illustrated in FIG. 8. Each step will be discussed in greater detail below. First, in Step 8010 a tool having protruding features is obtained. The protruding features correspond to the shapes and dimensions of the cavity and channel of the article being made. In certain embodiments, the tool is a polymeric tool. Suitable methods for making polymeric tools are described in detail in U.S. Pat. No. 5,435,816 (Spurgeon et al.). Often, the tool is formed of polypropylene or polyethylene. An advantage of using a polymeric tool is a greater ease of removing the molded article from the tool than when a metal tool is employed.

A first polymer is disposed on the protruding features of the tool in Step 8020. In Step 8030, a second polymer is disposed on the first polymer, which has been applied to the tool surface. The first polymer and the second polymer are as described above in detail with respect to the first and second aspects. In some embodiments, the first polymer and the second polymer are independently provided in the form of a sheet or as particulates (e.g., pellets). Next, compression is applied to the polymeric tooling, the first polymer, and the second polymer at an elevated temperature in Step 8040, to form an article. The first polymer and the second polymer can be characterized as being conformable, that is, they can be forced to take on the same shape, outline, or contour as the contacting surface of the tool.

The elevated temperature used in certain embodiments of the method is 300 degrees Fahrenheit (° F.) or less, 290° F., 285° F., 280° F., 275° F., 270° F., 265° F., 260° F., 255° F., 250° F., 245° F., 240° F., 235° F., 230° F., or 225° F. or less; and 150° F. or greater, 155° F., 160° F., 165° F., 170° F., 175° F., 180° F., 185° F., 190° F., 195° F., or 200° F. or greater. Applying compression optionally further includes cooling the article following exposure to the elevated temperature, such as by allowing to cool by exposure to ambient temperature, or by actively cooling the tool and/or the article.

In some embodiments, the method includes applying compression for 10 minutes or less, 9 minutes, 8 minutes, 7 minutes, 6 minutes, 5 minutes, or 4 minutes or less; and 0.5 minutes or greater, 1 minute, 2 minutes, or 3 minutes or greater. The method may include applying the compression to the entire area at a pressure of 15,000 pounds or less, 14,000 pounds, 13,000 pounds, 12,500 pounds, 12,000 pounds, 11,000 pounds, 10,000 pounds, 9,000 pounds, 8,000 pounds, or 7,500 pounds or less; and 3,000 pounds or more, 3,500 pounds, 4,000 pounds, 4,500 pounds, 5,000 pounds, 5,500 pounds, 6,000 pounds, 6,500 pounds, or 7,000 pounds. For instance, when applying the compression at 10,000 pounds to an area of 81 square inches (522.58 square centimeters), the compression would be 12 psi (0.083 megaPascals).

Referring again to FIG. 8, optionally, a third polymer is disposed on the second polymeric layer in Step 8050. In such embodiments, compression is typically applied to the second polymeric layer at an elevated temperature to bond the second polymeric layer to the third layer in (optional) Step 8060. The compression needed to bond (e.g., laminate)

the second polymeric layer to the third layer can be significantly less than used to form the article in the prior steps, such as 1 pound per square inch (psi) (6.9 kiloPascals) to 10 psi (68.9 kiloPascals). Hence, in some embodiments, the method further comprises melt bonding the second polymeric layer to the third polymeric layer.

Preferably, the third polymeric layer includes a reagent, for instance reagents described above with respect to the first and second aspects. Articles including reagents can be used in detection devices for an analyte of interest.

In select embodiments, the method further includes subjecting the article to post-curing, which can be performed using actinic radiation, such as UV radiation, e-beam radiation, visible radiation, or any combination thereof. The skilled practitioner can select a suitable radiation source and range of wavelengths for a particular application without undue experimentation. So called post cure ovens, which combine UV radiation and thermal energy, are particularly well suited for use in the post-cure processes. In general, post-curing improves the mechanical properties and stability of the article relative to the same article that is not post cured.

At least certain embodiments of the present methods unexpectedly provide multilayered, melt bondable, spontaneous capillary microfluidic articles having small cavity/ chamber volumes. In contrast, each of PCT Publication WO 98/45693 (Soane et al.) and U.S. Pat. No. 7,553,393 (Derand et al.) describe the use of heat-sealing cover layers to microfluidic structures formed in a second film. These documents, however, do not address the situation where the heat bond is located on the cavity side (e.g., channels of the microfluidic structures), as would be required for lamination to a detection (e.g., sensor) layer. Each of U.S. Pat. No. 5,798,031 (Charlton et al.) and U.S. Pat. No. 8,617,367 (Edelbrock et al.) describe thermoforming features in a heat bondable film for subsequent lamination to a detection layer. In these examples, the film is placed with the heat bondable layer facing away from the thermoforming tool to prevent it from adhering to the tool surface during thermoforming. The result of this orientation requirement is the generation of films having a Z axis profile, which are less mechanically robust than articles having one planar major surface. In addition, fine features (e.g., dimensions smaller than the thickness of the thermoformed film) are difficult to generate, therefore device assembly requires additional processing steps to generate vent features (e.g., a channel) in the chambers.

Select Embodiments of the Disclosure

Embodiment 1 is an article. The article includes a) a first polymeric layer having a first major surface that is substantially planar and an opposing second major surface; and b) a second polymeric layer bonded to the first polymeric layer. The second polymeric layer has a first major surface and a second major surface, and the first major surface of the second polymeric layer is conformal to the second major surface of the first polymeric layer. The second major surface of the second polymeric layer defines a cavity including at least one wall. The second polymeric layer has a channel connecting the cavity to at least one edge of the second polymeric layer. A surface of the cavity exhibits an advancing contact angle with water of less than 90 degrees.

Embodiment 2 is another article. The article includes a) a first polymeric layer having a first major surface that is substantially planar and an opposing second major surface; and b) a second polymeric layer bonded to the first polymeric layer. The second polymeric layer has a first major surface and a second major surface, and the first major surface of the second polymeric layer is conformal to the second major surface of the first polymeric layer. The second major surface of the second polymeric layer defines a cavity comprising at least one wall. The second polymeric layer has a channel connecting the cavity to the first major surface of the first polymeric layer. A surface of the cavity exhibits an advancing contact angle with water of less than 90 degrees.

Embodiment 3 is the article of embodiment 1 or embodiment 2, further including a third layer bonded to the second polymeric layer.

Embodiment 4 is the article of embodiment 3, wherein the third layer includes a reagent.

Embodiment 5 is the article of embodiment 4, wherein the reagent is configured to react with a sample and provide a response selected from electrochemical, optical, fluorescent, chemiluminescent, or a combination thereof.

Embodiment 6 is the article of embodiment 3, wherein the third layer is polymeric.

Embodiment 7 is the article of embodiment 3, wherein the third layer is inorganic or ceramic.

Embodiment 8 is the article of embodiment 3, wherein the third layer further includes a detector.

Embodiment 9 is the article of embodiment 8, wherein the detector includes an electrode disposed on a first major surface of the third layer, and wherein the chamber of the second polymeric layer is in fluid communication with the electrode.

Embodiment 10 is the article of any of embodiments 3 to 9, wherein the second polymeric layer is hermetically sealed to the third layer.

Embodiment 11 is the article of any of embodiments 2 to 10, wherein the channel of the second polymeric layer exhibits an advancing contact angle with water of greater than 90 degrees.

Embodiment 12 is the article of any of embodiments 2 to 11, wherein the cavity of the second polymeric layer has one wall that forms a curved shape.

Embodiment 13 is the article of any of embodiments 3 to 14, wherein a surface of the third layer and the cavity of the second polymeric layer together define a chamber.

Embodiment 14 is the article of embodiment 13, wherein the cavity of the second polymeric layer has a first side wall, a second side wall, and an upper wall, which together with an edge of the third layer form a trapezoidal shape.

Embodiment 15 is the article of embodiment 13, wherein the cavity of the second polymeric layer has a first side wall and a second side wall, which together with an edge of the third layer form a triangular shape.

Embodiment 16 is the article of any of embodiments 13 to 15, wherein the chamber has an open end and a distal end, and wherein the channel connects to the chamber closer to the distal end than to the open end.

Embodiment 17 is the article of any of embodiments 13 to 16, wherein the chamber has an open end and a distal end, and wherein the channel connects to the chamber at the distal end.

Embodiment 18 is the article of embodiment 15, wherein the chamber has an open end and a distal end, and wherein the channel connects to the chamber closer to the open end than to the distal end.

Embodiment 19 is the article of any of embodiments 15 to 18, wherein the chamber has a height at an open end that is larger than a height at a closed end.

Embodiment 20 is the article of any of embodiments 1 to 19, which is dimensionally stable with a strain less than 50%, 40%, 30%, 20%, 15%, 10%, or less than 5%, at a temperature of 25 degrees Celsius (° C.).

Embodiment 21 is the article of any of embodiments 1 to 20, wherein the first polymeric layer includes a polyolefin, a polyester, a polyamide, a poly(vinyl chloride), a polyether ester, a polyimide, a polyesteramide, a polyacrylate, a polyvinylacetate, or a hydrolyzed derivative of polyvinylacetate.

Embodiment 22 is the article of any of embodiments 1 to 21, wherein the first polymeric layer includes polyethylene terephthalate (PET).

Embodiment 23 is the article of any of embodiments 1 to 22, wherein the Vicat softening temperature of the second polymeric layer is at least 10% lower than the Vicat softening temperature of the first polymeric layer.

Embodiment 24 is the article of any of embodiments 1 to 23, wherein the second polymeric layer has a Vicat softening temperature ($T_g$) of 100 degrees Celsius (° C.) or less.

Embodiment 25 is the article of any of embodiments 1 to 24, wherein the second polymeric layer includes a low density polyethylene, ethylene vinyl acetate, a polyurethane, copolymers of a polyester and a polyolefin, copolymers of a polyurethane and an aromatic poly(meth)acrylate, copolymers of a polycaprolactone and a polyurethane, or a combination thereof.

Embodiment 26 is the article of any of embodiments 1 to 25, further including a tie layer disposed between the first polymeric layer and the second polymeric layer.

Embodiment 27 is the article of any of embodiments 1 to 26, wherein the cavity of the second polymeric layer has a surface including a surfactant, a surface treatment, a hydrophilic polymer, or a combination thereof.

Embodiment 28 is the article of embodiment 27, wherein the surfactant includes C8-C18 alkane sulfonates; C8-C18 secondary alkane sulfonates; alkylbenzene sulfonates; C8-C18 alkyl sulfates; alkylether sulfates; sodium laureth 4 sulfate; sodium laureth 8 sulfate;

dioctylsulfosuccinate, sodium salt; lauroyl lacylate; stearoyl lactylate; or combinations thereof.

Embodiment 29 is the article of embodiment 27 or embodiment 28, wherein the surface treatment includes a hydrophilic coating comprising plasma deposited silicon/oxygen materials, diamond-like glass (DLG) materials, and combinations thereof. Embodiment 30 is the article of any of embodiments 27 to 29, wherein the hydrophilic polymer includes a polyester, a polyamide, a polyurethane, a poly(vinyl alcohol), a poly(alkylene glycol), a poly(alkylene oxide), a poly(vinyl pyrrolidone), a rubber elastomer, or combinations thereof.

Embodiment 31 is the article of any of embodiments 1 to 30, wherein the first polymeric layer further includes a fiducial structure or mark.

Embodiment 32 is the article of any of embodiments 1 to 31, wherein the second polymeric layer further includes a fiducial structure or mark.

Embodiment 33 is the article of any of embodiments 1 or 3 to 32, wherein the channel of the second polymeric layer has a first side wall, a second side wall, and an upper wall, which together with a third layer form a trapezoidal shape.

Embodiment 34 is the article of any of embodiments 1 or 3 to 32, wherein the channel of the second polymeric layer has a first side wall and a second side wall, which meet and form an angle between 10 degrees and 120 degrees.

Embodiment 35 is the article of any of embodiments 1 or 3 to 34, wherein the channel of the second polymeric layer connects the cavity to two edges of the second polymeric layer.

Embodiment 36 is the article of any of embodiments 1 or 3 to 35, wherein the channel of the second polymeric layer has a length and a width, and a ratio of the length to the width is 50:1 or greater.

Embodiment 37 is the article of any of embodiments 1 to 36, wherein the cavity of the second polymeric layer has a volume of 1 microliter or less, 0.5 microliters or less, or 0.2 microliters or less.

Embodiment 38 is the article of any of embodiments 1 to 37, wherein the cavity of the second polymeric layer has a length that is 6 millimeters or less, 5 millimeters or less, or 4 millimeters or less.

Embodiment 39 is the article of any of embodiments 1 to 38, wherein the cavity of the second polymeric layer has a height that is 0.2 millimeters or less, 0.15 millimeters or less, or 0.10 millimeters or less.

Embodiment 40 is the article of any of embodiments 1 or 3 to 39, wherein the channel of the second polymeric layer has a height that is 0.1 millimeters or less, 0.050 millimeters or less, or 0.040 millimeters or less.

Embodiment 41 is the article of any of embodiments 1 to 40, wherein the first polymeric layer has a maximum thickness of 500 micrometers.

Embodiment 42 is the article of any of embodiments 1 to 41, wherein the second polymeric layer has an average thickness of 5 micrometers to 50 micrometers.

Embodiment 43 is the article of any of embodiments 1 or 3 to 42, wherein the cavity has a first volume, the channel of the second polymeric layer has a second volume, and the second volume is 0.1% to 10% of the first volume.

Embodiment 44 is the article of any of embodiments 2 to 42, wherein the cavity has a first volume, the channel of the second polymeric layer has a second volume, and the second volume is 0.001% to 0.1% of the first volume.

Embodiment 45 is the article of any of embodiments 1 to 44, wherein the first polymeric layer, the second polymeric layer, or both, are transparent.

Embodiment 46 is a method of making an article of any of embodiments 1 to 45. The method includes a) obtaining a tool comprising protruding features; b) disposing a first polymer on the protruding features; c) disposing a second polymer on the first polymer; and d) applying compression to the polymeric tooling, the first polymer, and the second polymer at an elevated temperature to form the article. The second polymer forms the first polymeric layer of the article and the first polymer forms the second polymeric layer of the article.

Embodiment 47 is the method of embodiment 46, further including subjecting the article to post-curing.

Embodiment 48 is the method of embodiment 46 or embodiment 47, wherein the tool is a polymeric tool.

Embodiment 49 is the method of embodiment 46, wherein the tool is formed of polypropylene.

Embodiment 50 is the method of any of embodiments 46 to 49, wherein the elevated temperature is 300 degrees Fahrenheit (° F.) or less, 275° F. or less, 250° F. or less, or 225° F. or less.

Embodiment 51 is the method of any of embodiments 46 to 50, including applying compression for 10 minutes or less, 8 minutes or less, 6 minutes or less, 5 minutes or less, or 4 minutes or less.

Embodiment 52 is the method of any of embodiments 46 to 51, including applying compression at a pressure of 15,000 pounds or less, 12,500 pounds or less, 10,000 pounds or less, or 7,500 pounds or less.

Embodiment 53 is the method of any of embodiments 46 to 52, wherein the applying compression further includes cooling the article following exposure to the elevated temperature.

Embodiment 54 is the method of any of embodiments 46 to 53, further including melt bonding the second polymeric layer to a third polymeric layer.

Embodiment 55 is a method of making an article. The method includes a) obtaining a tool comprising protruding features; b) disposing a first polymer on the protruding features; c) disposing a second polymer on the first polymer; d) applying compression to the polymeric tooling, the first polymer, and the second polymer at an elevated temperature to form the article, wherein the second polymer forms a first polymeric layer of the article and the first polymer forms a second polymeric layer of the article; e) disposing a third layer on the second polymeric layer, the third layer disposed on a first major surface of the third layer and the first major surface being in contact with the second polymeric layer; and f) applying compression to the second polymeric layer at an elevated temperature to bond the second polymeric layer to the third layer. The article includes 1) a first polymeric layer having a first major surface that is substantially planar and an opposing second major surface; 2) a second polymeric layer bonded to the first polymeric layer; and 3) a third layer bonded to the second polymeric layer. The second polymeric layer has a first major surface and a second major surface and the first major surface of the second polymeric layer is conformal to the second major surface of the first polymeric layer. The second major surface of the second polymeric layer defines a cavity including at least one wall. The second polymeric layer has a channel connecting the cavity to at least one edge of the second polymeric layer or to the first major surface of the first polymeric layer. A surface of the cavity exhibits an advancing contact angle with water of less than 90 degrees. A surface of the third layer and the cavity of the second polymeric layer together define a chamber. The reagent is configured to react with a sample and provide a response selected from electrochemical, optical, fluorescent, chemiluminescent, or a combination thereof.

Embodiment 56 is the method of embodiment 55, wherein the third layer includes a third polymer and none of the first polymer, the second polymer, or the third polymer is a pressure sensitive adhesive.

EXAMPLES

Objects and advantages of this disclosure are further illustrated by the following examples, but the particular materials and amounts thereof recited in these examples, as well as other conditions and details, should not be construed to unduly limit this disclosure. Unless otherwise noted or otherwise apparent from the context, all parts, percentages, ratios, etc. in the Examples and the rest of the specification are by weight. Table 1 (below) lists materials used in the examples and their sources.

Preparation of Molding Tools

Molding Tool A:

Articles were prepared using standard compression molding procedures. In the first step for creating the final mold assembly, Molding Tool A was created having a feature pattern allowing for the preparation of multiple articles from a single mold. The desired feature pattern was cut into a copper sheet with a diamond end mill. The pattern included a series of parallel cavities [1 cm (length, x-direction) 1.4 mm (width, y-direction), 0.150 mm (depth), and sidewall angle of 45 degrees] that were edge aligned with respect to the x-direction and spaced about 7 mm apart with respect to the y-direction. A channel perpendicular to x-axis (longitudinal axis) of the cavities was cut extending through the cavities. The channel had a trapezoidal cross section (0.014 mm at the base, 0.050 mm at the opening, 0.050 mm depth, with a sidewall angle of 20 degrees). The channel was positioned to intersect each cavity 0.5 mm from the end.

Molding Tool B:

Polypropylene Molding Tool B was prepared from Molding Tool A using compression molding. The upper and lower platens of a hydraulic press were heated to 350° F. (176.7° C.) and a sheet of silicone [10 inch by 10 inch by $\frac{1}{8}$ inch (25.4 cm by 25.4 cm by 3.2 mm), obtained from the McMaster-Carr Company, Elmhurst, IL] was placed on the lower platen. Molding Tool A [9 inch by 9 inch (22.9 cm by 22.9 cm)] was placed on the silicone sheet with the featured surface of Molding Tool A facing the upper platen. A stack of six sheets of 5 mil (0.127 mm) thick polypropylene [8 inch by 8 inch (20.3 cm by 20.3 cm), obtained from the Braskem Company, Philadelphia, PA] was placed over molding Tool A and then a sheet of $\frac{1}{16}$ inch (1.58 mm) thick PTFE [10 inch by 10 inch (25.4 cm by 25.4 cm), obtained from the McMaster-Carr Company] was placed over the polypropylene stack. The platens were closed and the assembly was placed under 1000 pounds of pressure for five minutes and then cooled to 70° F. while remaining under pressure. The platens were separated and the resulting polypropylene Molding Tool B was removed.

Molding Tool C:

Articles were prepared using standard compression molding procedures. In the first step for creating the final mold assembly, Molding Tool C was created having a feature pattern allowing for the preparation of multiple articles from a single mold. The desired feature pattern was cut into a copper sheet with a diamond end mill. The pattern included a series of parallel cavities [1 cm (length, x-direction) 1.4 mm (width, y-direction), 0.150 mm (depth), and sidewall angle of 45 degrees] that were edge aligned with respect to the x-direction and spaced about 7 mm apart with respect to the y-direction. A channel perpendicular to x-axis (longitudinal axis) of the cavities was cut extending through the cavities. The channel had a triangular cross section (isosceles right triangle with a 0.025 mm depth and opening of 0.050 mm). The channel was positioned to intersect each cavity 0.5 mm from the end.

Molding Tool D:

Polypropylene Molding Tool D was prepared from Molding Tool C using the same procedure described for Molding Tool B.

Example 1

The upper and lower platens of a hydraulic press were heated to 230° F. (110° C.) and Molding Tool B was placed on the lower platen with the featured surface of the tool facing the upper platen. Polyurethane pellets (obtained under the trade designation PEARLBOND 1160L from the Lubrizol Corporation, Wickliffe, OH) were placed over Molding Tool B to form a single, packed layer of pellets about 10 cm in diameter. A sheet of 5 mil (0.127 mm) thick polyester film [10 inch by 10 inch (25.4 cm by 25.4 cm), obtained under the trade designation MELIEX 454 from TEKRA, New Berlin, WI] was placed over the pellets. The assembly was completed by placing a $\frac{1}{32}$ inch (0.79 mm) sheet of stainless steel [10 inch by 10 inch (25.4 cm by 25.4 cm), obtained from the McMaster-Carr Company] over the polyester film. The assembly was placed under 10000 pounds of pressure for five minutes and then cooled to 70° F. (21.1° C. while remaining under pressure. The platens were separated and the molded article was removed from the tool.

Example 2

A molded article was prepared from Molding Article D using the same procedure as described in Example 1.

Example 3

The molded article of Example 1 was coated with an aqueous solution of sodium dodecylbenzenesulfonate (SDBS, 1 wt. %) by wiping the solution over the featured surface of the article using a cotton tipped applicator. The coating was air dried.

Example 4

A silicon containing layer was applied to the featured surface of the molded article of Example 1 using a Plasma-Therm 3032 batch plasma reactor (obtained from Plasma-Therm LLC, St. Petersburg, FL). The instrument was configured for reactive ion etching with a 26 inch lower powered electrode and central gas pumping. The chamber was pumped with a roots type blower (model EH1200 obtained from Edwards Engineering, Burgess Hill, UK) backed by a dry mechanical pump (model iQDP80 obtained from Edwards Engineering). The RF power was delivered by a 3 kW, 13.56 Mhz solid-state generator (RFPP model RF30S obtained from Advanced Energy Industries, Fort Collins, CO). The system had a nominal base pressure of 5 mTorr. The flow rates of the gases were controlled by MKS flow controllers (obtained from MKS Instruments, Andover, MA).

Samples of the molded article were fixed on the powered electrode of the plasma reactor. After pumping down to the base pressure, the gases tetramethylsilane (TMS) and oxygen (02) were introduced. Once the gas flows stabilized in the reactor, rf power (1000 watts) was applied to the electrode to generate the plasma. The plasma treatment was a two step process. In the first step TMS was introduced at a flow rate of 150 sccm (standard $cm^3$/minute), oxygen was introduced at a flow rate of 500 sccm, and the deposition time was 30 seconds. In the second step, oxygen was introduced at a flow rate of 500 sccm and the treatment time was 20 seconds. Following completion of the plasma treatment, the chamber was vented to the atmosphere and the plasma treated molded article was removed from the chamber.

Example 5

A coupon containing a single cavity with a channel extending on each side of the cavity was cut from the molded sheet of Example 3. The lower platen of a hydraulic press was heated to 50° C. and the coupon was placed on the warm platen with the coated, featured surface facing away from the platen. After warming for 30 seconds, a section of 5 mil (0.127 mm) thick MELINEX 454 polyester film was laminated to the featured side using hand pressure. Lamination of the film to the featured surface of the coupon resulted in the formation of a chamber defined by the walls of the cavity and the laminated film. The resulting article was removed from the platen and allowed to cool. The article was then cut with a razor blade across the width of the chamber and trimmed to provide a finished article as shown in FIG. 3 (overall dimensions 0.5 cm by 2 cm) in which the chamber had an open end centered on one edge of the article, a distal closed end, and a channel that extended from the chamber having open ends located on each opposing edge of the article. The channel served as vents for the chamber. In finished articles, the length of the chamber from open end to closed end ranged from about 3.2 mm to 5.0 mm.

In an alternative procedure, the order of operations for constructing the finished article can be reversed. In this procedure, samples from the molded article of Example 3 are first cut into the shape of a finished article and then laminated with the polyester film.

Example 6

A coupon containing a single cavity with a channel that extended on each side of the cavity was cut from the molded sheet of Example 3. The lower platen of a hydraulic press was heated to 50° C. and the coupon was placed on the warm platen with the coated, featured surface facing away from the platen. After warming for 30 seconds, a section of 5 mil (0.127 mm) thick MELINEX 454 polyester film was laminated to the featured side using hand pressure. Lamination of the film to the featured surface of the coupon resulted in the formation of a chamber defined by the walls of the cavity and the laminated film. The resulting laminated product was removed from the platen and allowed to cool. The laminated product was then cut with a razor blade across the width of the chamber and trimmed to provide an article having overall dimensions of 0.5 cm by 2 cm. The article was cut and trimmed so that it contained a chamber with an open end centered on one edge of the article and a distal closed end, but did not contain any molded channels extending laterally from the chamber. The finished article as shown in FIG. 2B was prepared by laser drilling (Muse Laser System, obtained from the Full Spectrum Laser Company, Las Vegas, NV) an approximately 150 micrometer diameter channel through the laminated polyester and polyurethane film layers over the chamber section. The drilled channel was located about 1 mm from the closed end of the chamber. The channel served as a vent for the chamber. In finished articles, the length of the chamber from open end to closed end ranged from about 4.8 mm to 6.0 mm.

Alternatively, the order of operations for constructing finished article can be changed. In this procedure, samples from the molded article of Example 3 are first cut into the shape of a finished article. Next, the laser drilled channel is then formed and the polyester film is laminated in the final step.

Example 7

Whole blood was obtained from healthy human donors and collected by venipuncture into vacutainer tubes or syringes containing EDTA. The blood samples (3 microliters) were deposited using a micropipette into the open cavity ends of finished articles from Examples 4 and 5. The time required for the blood sample to wick through each article was determined by time lapse imaging of blood sample travel using a Zeiss Lumar stereomicroscope (Carl Zeiss AG, Oberkochen, Germany equipped with a digital camera (capture rate of 30 milliseconds per frame). The images were analyzed to determine the total wicking time from initial contact of the blood to the terminal distance of blood travel. The results are shown in Tables 1 and 2.

TABLE 1

| Article from | Chamber Length (mm) | Total Wicking Time to Fill Chamber (seconds) | Wicking Speed (mm/second) |
| --- | --- | --- | --- |
| Example 4 | 4.5 | 0.94 | 0.21 |
| Example 4 | 4.1 | 0.84 | 0.20 |
| Example 4 | 3.3 | 0.66 | 0.20 |
| Example 4 | 3.8 | 0.70 | 0.18 |
| Example 4 | 5.0 | 1.08 | 0.22 |

TABLE 2

| Article from | Chamber Length (mm) | Total Wicking Time to Fill Chamber (seconds) | Wicking Speed (mm/second) |
| --- | --- | --- | --- |
| Example 5 | 5.3 | 0.52 | 0.10 |
| Example 5 | 4.9 | 0.61 | 0.12 |
| Example 5 | 5.9 | 0.80 | 0.14 |
| Example 5 | 5.6 | 0.70 | 0.13 |
| Example 5 | 5.5 | 1.10 | 0.20 |

All of the patents and patent applications mentioned above are hereby expressly incorporated by reference. The embodiments described above are illustrative of the present invention and other constructions are also possible. Accordingly, the present invention should not be deemed limited to the embodiments described in detail above and shown in the accompanying drawings, but instead only by a fair scope of the claims that follow along with their equivalents.

The invention claimed is:

1. An article comprising:
a first polymeric layer having a first major surface that is substantially planar and an opposing second major surface;
a second polymeric layer bonded to the first polymeric layer, the second polymeric layer having a first major surface and a second major surface, wherein the first major surface of the second polymeric layer is conformal to the second major surface of the first polymeric layer, wherein the second major surface of the second polymeric layer defines a cavity comprising at least one wall, and
a channel having an inlet at the cavity and an outlet on an edge of the second polymeric layer at a location remote from the cavity or on the first major surface of the first polymeric layer,
wherein the second polymeric layer has a Vicat softening temperature ($T_g$) of 100 degrees Celsius (° C.) or less, and wherein a surface of the cavity exhibits an advancing contact angle with water of less than 90 degrees.

2. The article of claim 1, wherein the channel has the outlet on the first major surface of the first polymeric layer.

3. The article of claim 1, further comprising a third layer bonded to the second polymeric layer.

4. The article of claim 3, wherein the third layer comprises a reagent configured to react with a sample and provide a response selected from electrochemical, optical, fluorescent, chemiluminescent, or a combination thereof.

5. The article of claim 4, wherein the third layer further comprises a detector.

6. The article of claim 5, wherein the detector comprises an electrode disposed on a first major surface of the third layer, and wherein the cavity of the second polymeric layer is in fluid communication with the electrode.

7. The article of claim 3, wherein the second polymeric layer is hermetically sealed to the third layer.

8. The article of claim 1, which has a stretch ratio less than 50%, 40%, 30%, 20%, 15%, 10%, or less than 5%, at a temperature of 25 degrees Celsius (° C.).

9. The article of claim 1, wherein the first polymeric layer comprises a polyolefin, a polyester, a polyamide, a poly (vinyl chloride), a polyether ester, a polyimide, a polyester-amide, a polyacrylate, a polyvinylacetate, or a hydrolyzed derivative of polyvinylacetate.

10. The article of claim 1, wherein the second polymeric layer comprises a low density polyethylene, ethylene vinyl acetate, a polyurethane, copolymers of a polyester and a polyolefin, copolymers of a polyurethane and an aromatic poly(meth)acrylate, copolymers of a polycaprolactone and a polyurethane, or a combination thereof.

11. The article of claim 1, wherein the cavity of the second polymeric layer has a surface comprising a surfactant, a surface treatment, a hydrophilic polymer, or a combination thereof.

12. The article of claim 1, wherein the channel has the outlet on an edge of the second polymeric layer and wherein the channel has a length and a width, and a ratio of the length to the width is 50:1 or greater.

13. The article of claim 1, wherein the cavity of the second polymeric layer has a volume of 1 microliter or less, 0.5 microliters or less, or 0.2 microliters or less.

14. The article of claim 1, wherein the channel has the outlet on at least one edge of the second polymeric layer and wherein the channel has a height that is 0.1 millimeters or less, 0.050 millimeters or less, or 0.040 millimeters or less.

15. A method of making an article, the method comprising:
obtaining a tool comprising protruding features;
disposing a first polymer on the protruding features;
disposing a second polymer on the first polymer;
applying compression to the tool, the first polymer, and the second polymer at an elevated temperature to form the article, wherein the second polymer forms a first polymeric layer of the article and the first polymer forms a second polymeric layer of the article;
disposing a third layer on the second polymeric layer, the first major surface being in contact with the second polymeric layer;
applying compression to the second polymeric layer at an elevated temperature to bond the second polymeric layer to the third layer;
wherein the article comprises:
a first polymeric layer having a first major surface that is substantially planar and an opposing second major surface;
a second polymeric layer bonded to the first polymeric layer, the second polymeric layer having a first major surface and a second major surface, wherein the first major surface of the second polymeric layer is conformal to the second major surface of the first polymeric layer, wherein the second major surface of the second polymeric layer defines a cavity comprising at least one wall, and
a channel having an inlet at the cavity and an outlet on an edge of the second polymeric layer at a location remote from the cavity or on the first major surface of the first polymeric layer,
wherein the second polymeric layer has a Vicat softening temperature ($T_g$) of 100 degrees Celsius (° C.) or less, and wherein a surface of the cavity exhibits an advancing contact angle with water of less than 90 degrees; and a third layer bonded to the second polymeric layer, wherein a surface of the third layer and the cavity of the second polymeric layer together define a chamber.

16. The method of claim 15, wherein the third layer comprises a third polymer and none of the first polymer, the second polymer, or the third polymer is a pressure sensitive adhesive.

\* \* \* \* \*